US010969668B2

(12) United States Patent
Ma et al.

(10) Patent No.: US 10,969,668 B2
(45) Date of Patent: *Apr. 6, 2021

(54) ADJUSTABLE LIGHT DISTRIBUTION FOR ACTIVE DEPTH SENSING SYSTEMS

(71) Applicant: QUALCOMM Incorporated, San Diego, CA (US)

(72) Inventors: Jian Ma, San Diego, CA (US); Sergiu Goma, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/253,648

(22) Filed: Jan. 22, 2019

(65) Prior Publication Data

US 2020/0033713 A1    Jan. 30, 2020

Related U.S. Application Data

(60) Provisional application No. 62/702,748, filed on Jul. 24, 2018, provisional application No. 62/702,770,
(Continued)

(51) Int. Cl.
*G03B 21/20* (2006.01)
*G02B 27/09* (2006.01)
(Continued)

(52) U.S. Cl.
CPC ....... *G03B 21/2006* (2013.01); *G02B 5/0205* (2013.01); *G02B 5/1833* (2013.01);
(Continued)

(58) Field of Classification Search
CPC ............ G03B 21/2006; G03B 21/2073; G02B 5/0205; G02B 5/1833; G02B 27/0944;
(Continued)

(56) References Cited

U.S. PATENT DOCUMENTS 9,325,973 B1    4/2016  Hazeghi et al.
10,802,382 B2 * 10/2020  Ma ...................... G01B 11/2513
(Continued)

FOREIGN PATENT DOCUMENTS

CN    108169981 A    6/2018
DE    102012021179 A1    5/2013
(Continued)

OTHER PUBLICATIONS

An J-W: "Wavelength-Selective Device Using a Phase Delay Layer and Two Polarization-Sensitive Gratings", IEEE Photonics Technology Letters, IEEE Photonics Technology Letters, IEEE Service Center, Piscataway, NJ, US, vol. 18 (6), Mar. 15, 2007, pp. 369-371, XP011165588, ISSN: 1041-1135, p. 1; figure 1.
(Continued)

*Primary Examiner* — Michelle M Iacoletti
*Assistant Examiner* — Magda Cruz
(74) *Attorney, Agent, or Firm* — QUALCOMM Incorporated

(57) ABSTRACT

Aspects of the present disclosure relate to systems and methods for active depth sensing. An example device includes a light projector. The light projector includes a light source to emit light and a diffractive element. The diffractive element is configured to receive the emitted light that is polarized, project a first distribution of light when the received light has a first polarity, and project a second distribution of light when the received light has a second polarity.

28 Claims, 22 Drawing Sheets

Related U.S. Application Data filed on Jul. 24, 2018, provisional application No. 62/702,782, filed on Jul. 24, 2018.

(51) Int. Cl.
    *G02F 1/1335*     (2006.01)
    *G02B 5/02*     (2006.01)
    *G02B 5/18*     (2006.01)

(52) U.S. Cl.
    CPC ....... *G02B 27/095* (2013.01); *G02B 27/0944* (2013.01); *G02B 27/0977* (2013.01); *G02F 1/133502* (2013.01); *G03B 21/2073* (2013.01)

(58) Field of Classification Search
    CPC .............. G02B 27/095; G02B 27/0977; G02F 1/133502
    See application file for complete search history.

(56) References Cited

U.S. PATENT DOCUMENTS

| | | | |
|---|---|---|---|
| 2006/0132772 A1* | 6/2006 | Maximus | H04N 9/3147 356/368 |
| 2008/0204847 A1* | 8/2008 | Kamm | G02B 27/48 359/238 |
| 2008/0239420 A1 | 10/2008 | McGrew | |
| 2008/0253265 A1 | 10/2008 | Murata et al. | |
| 2010/0202725 A1* | 8/2010 | Popovich | G02B 6/005 385/10 |
| 2011/0298918 A1 | 12/2011 | McEldowney | |
| 2014/0022616 A1 | 1/2014 | Popovich et al. | |
| 2015/0260510 A1 | 9/2015 | Nakajima | |
| 2016/0164258 A1 | 6/2016 | Weichmann et al. | |
| 2017/0052374 A1* | 2/2017 | Waldern | G02B 6/34 |
| 2018/0038685 A1 | 2/2018 | Torri et al. | |
| 2018/0113200 A1* | 4/2018 | Steinberg | G02B 26/10 |
| 2018/0196998 A1 | 7/2018 | Price et al. | |
| 2018/0205937 A1 | 7/2018 | Zhu et al. | |
| 2018/0373134 A1 | 12/2018 | Takahama | |
| 2019/0018175 A1* | 1/2019 | Mirell | H01S 3/08031 |
| 2019/0101381 A1 | 4/2019 | Chen et al. | |
| 2019/0129085 A1* | 5/2019 | Waldern | G02B 6/0036 |
| 2020/0033710 A1 | 1/2020 | Ma et al. | |
| 2020/0033711 A1 | 1/2020 | Ma et al. | |

FOREIGN PATENT DOCUMENTS

| | | |
|---|---|---|
| WO | WO-2012172295 A1 | 12/2012 |
| WO | WO-2017178781 A1 | 10/2017 |

OTHER PUBLICATIONS

International Search Report and Written Opinion—PCT/US2019/041890—ISA/EPO—dated Oct. 18, 2019.

\* cited by examiner

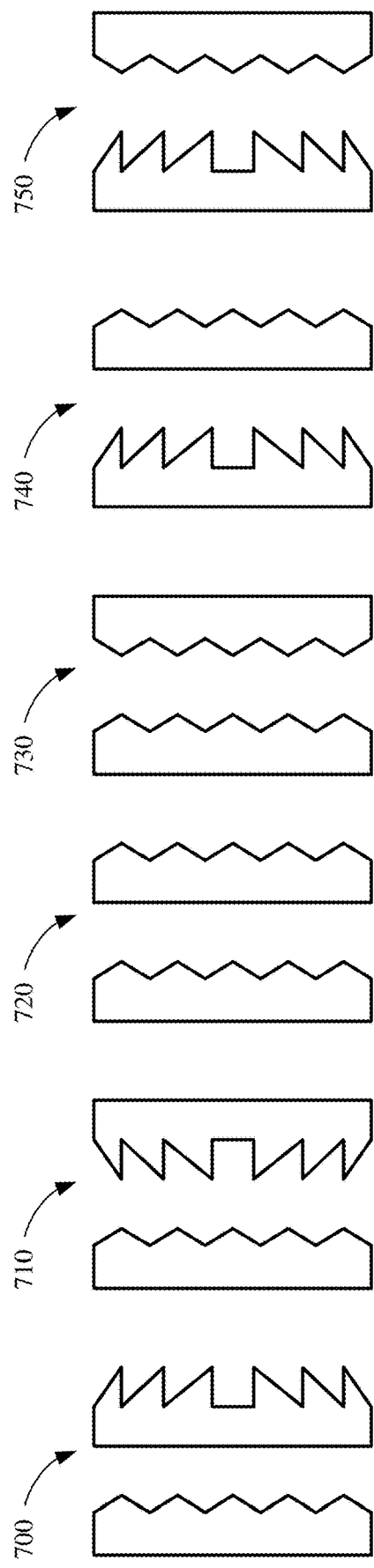
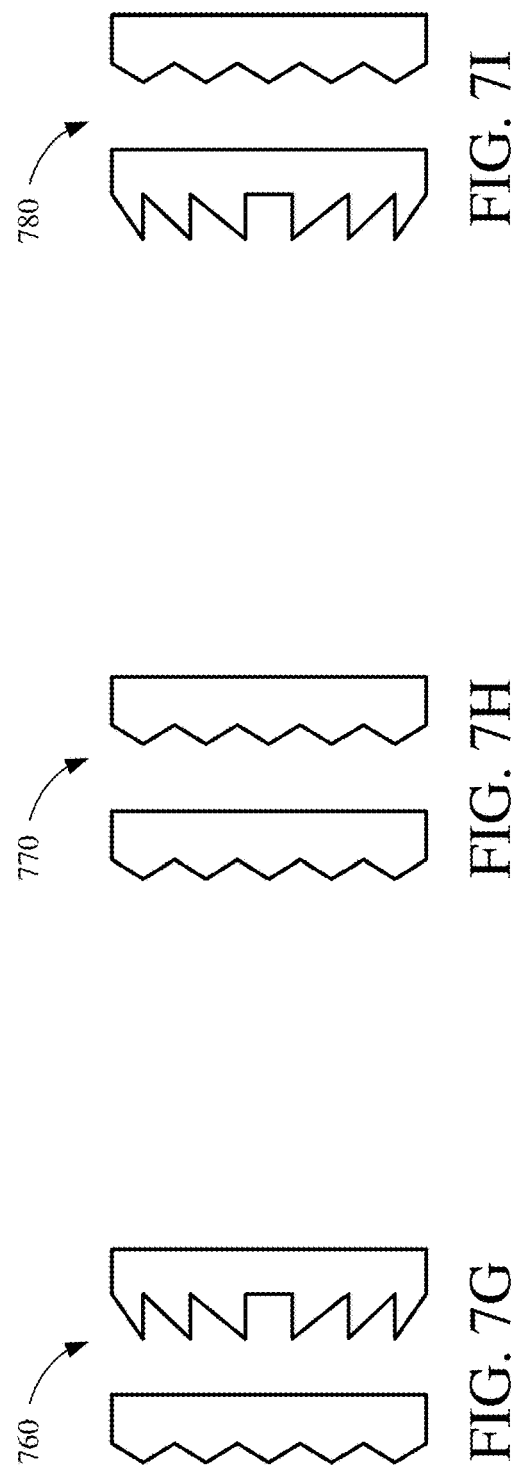

ADJUSTABLE LIGHT DISTRIBUTION FOR ACTIVE DEPTH SENSING SYSTEMS

RELATED APPLICATIONS

This patent application claims priority to: U.S. provisional patent application No. 62/702,748 entitled "ADJUSTABLE LIGHT DIFFRACTION" filed on Jul. 24, 2018, which is assigned to the assignee hereof; U.S. provisional patent application No. 62/702,770 entitled "ADJUSTABLE LIGHT DIFFRACTION" filed on Jul. 24, 2018, which is assigned to the assignee hereof; and U.S. provisional patent application No. 62/702,782 entitled "ADJUSTABLE LIGHT DIFFRACTION" filed on Jul. 24, 2018, which is assigned to the assignee hereof. The disclosure of the prior applications are considered part of and are incorporated by reference in this patent application.

This patent application is related to the following United States utility patent applications: United States patent application entitled "ADJUSTABLE LIGHT DISTRIBUTION FOR ACTIVE DEPTH SENSING SYSTEMS" and filed on the same day as the present application, and United States patent application entitled "ADJUSTABLE LIGHT PROJECTOR FOR FLOOD ILLUMINATION AND ACTIVE DEPTH SENSING" and filed on the same day as the present application. The disclosures of the applications are incorporated by reference in this patent application.

TECHNICAL FIELD

This disclosure relates generally to light projectors for active depth sensing systems, and specifically to adjusting the distribution of light from such projectors.

BACKGROUND

For active depth sensing, a device may include a light projector to project a distribution of light, for which reflections of the distribution of light are sensed and measured to determine distances of objects in a scene. For example, a device may include a light projector that projects a distribution of infrared (IR) light (such as a distribution of IR light points) onto a scene. An active light receiver captures reflections of the IR light in capturing an image, and the device determines depths or distances of objects in the scene based on the captured reflections.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Some aspects of the present disclosure relate to an example device including an adjustable light projector. The light projector includes a light source to emit light and a diffractive element. The diffractive element is configured to receive the emitted light that is polarized, project a first distribution of light when the received light has a first polarity, and project a second distribution of light when the received light has a second polarity.

Some further aspects of the present disclosure relate to a method for projecting an adjustable light projection. An example method includes emitting polarized light by a light source. The example method also includes projecting, by the diffractive element, a first distribution of light when the received light has a first polarity. The example method further includes projecting, by the diffractive element, a second distribution of light when the received light has a second polarity.

Some other aspects of the present disclosure relate to an example device. An example device includes means for emitting polarized light. The example device also includes means for projecting a first distribution of light from the light based on the light having a first polarity. The example device further includes means for projecting a second distribution of light from the light based on the light having a second polarity.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 7A is a depiction of an example arrangement of multiple diffractive optical elements of an adjustable diffraction projector.

FIG. 7B is a depiction of another example arrangement of multiple diffractive optical elements of an adjustable diffraction projector.

FIG. 7C is a depiction of a further example arrangement of multiple diffractive optical elements of an adjustable diffraction projector.

FIG. 7D is a depiction of another example arrangement of multiple diffractive optical elements of an adjustable diffraction projector.

FIG. 7E is a depiction of a further example arrangement of multiple diffractive optical elements of an adjustable diffraction projector.

FIG. 7F is a depiction of another example arrangement of multiple diffractive optical elements of an adjustable diffraction projector.

FIG. 7G is a depiction of a further example arrangement of multiple diffractive optical elements of an adjustable diffraction projector.

FIG. 7H is a depiction of another example arrangement of multiple diffractive optical elements of an adjustable diffraction projector.

FIG. 7I is a depiction of a further example arrangement of multiple diffractive optical elements of an adjustable diffraction projector.

DETAILED DESCRIPTION

Figure 1:
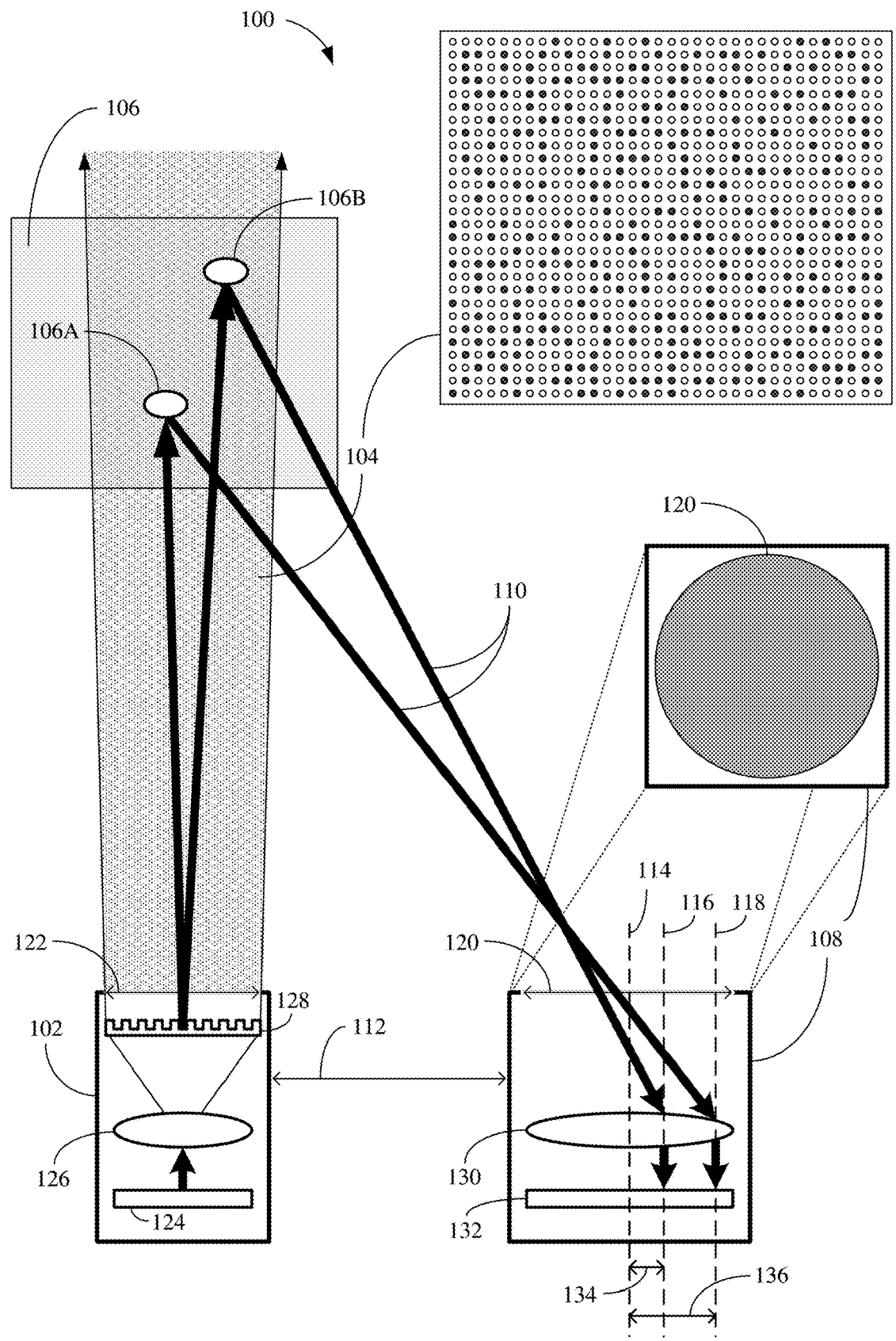
FIG. 1 is a depiction of an example active depth sensing system including a light projector for projecting a distribution of light.

Aspects of the present disclosure relate to active light projectors and flood illuminators, and include a light projector with an adjustable diffraction of the projected light.

An active depth sensing system may transmit light in a predefined distribution of points (or another suitable shape of focused light). The points of light may be projected on to a scene, and the reflections of the points of light may be received by the active depth sensing system. Depths of objects in a scene may be determined by comparing the pattern of the received light and the pattern of the transmitted light. In comparing the patterns, a portion of the predefined distribution for the transmitted light may be identified in the received light. In the present disclosure, an active depth sensing system that projects a distribution of light (such as a distribution of light points or other shapes) is referred to as a structured light system (with a structured light projector).

The light distribution emitted by a structured light projector does not change. Denser distributions of light (such as additional light points or more instances of focused light in an area than for sparser distributions of light) may result in a higher resolution of a depth map or a greater number of depths that may be determined. However, the intensity of individual light points are lower for denser distributions than for sparser distributions where the overall intensity is similar between the distribution. As a result, interference may cause identifying reflections of a denser distribution of light more difficult than for sparser distributions of light. For example, a structured light projector may project IR light (such as near infrared (NIR) light) with a 905 nm or 940 nm wavelength (or other suitable wavelength). A structured light receiver may receive reflections of the IR light as well as sunlight and other ambient light. Ambient light may cause interference of the IR light points. As a result, brightly lit scenes (such as outdoor scenes in daylight) may cause more interference than darker scenes (such as indoor scenes or nighttime) because of the additional ambient light being captured by the structured light receiver.

A structured light system may overcome interference by increasing the light intensity. For example, the structured light projector may use more power to increase the intensity of each light point. However, to ensure eye safety and compliance with any regulations on light transmission, the overall intensity of light in an area of the projection may be restricted. In this manner, the number of points or instances of light in the area affects the maximum intensity of each point or instance of light. As a result, each light point in a sparser distribution may have a higher maximum intensity than each light point in a denser distribution. Thus, a sparser distribution may be more suitable for daylight scenes (with more interference), and a denser distribution may be more suitable for indoor or nighttime scenes (with less interference).

However, many devices use the same structured light system in different types of lighting (with different amounts of interference). For example, a smartphone may include an active depth sensing system for face identification, and the smartphone may be used indoors and outdoors. If the light distribution for the structured light projector is fixed, the device would need to include more than one structured light projector to project distributions of light at different densities (and thus different intensities for each of the light instances in the light distributions). In some aspects of the present disclosure, a light projector may be configured to adjust the density of the light distribution.

Many devices also include a flood illuminator. A flood illuminator may project a diffuse light onto a scene so that enough light exists in the scene for an image sensor to capture one or more images of the scene. In one example, a device that performs face identification may need to first determine if a face to be identified exists in the scene. The device may include a flood illuminator to project IR light onto a scene so that an IR sensor may capture the scene and the device may determine from the capture if a face exists in the scene. If a face is determined to exist in the scene, the device may then use an active depth sensing system for face identification. If a light projector has a fixed distribution or refraction of light, a device including a flood illuminator and a structured light projector therefore is required to include at least two light projectors (such as two IR projectors). In some aspects of the present disclosure, a light projector may be adjustable to project diffuse light for flood illumination (such as for face detection) or project a distribution of light for active depth sensing (such as for face identification).

If a light projector is configured to adjust the density of the structured light projection or is configured to switch between flood illumination and active depth sensing, a device may include fewer light projectors, thus saving device space and requiring fewer device components.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 is a depiction of an example active depth sensing system 100. The active depth sensing system 100 (which herein also may be called a structured light system) may be used to generate a depth map (not pictured) of a scene 106. For example, the scene 106 may include a face, and the active depth sensing system 100 may be used for identifying or authenticating the face. The active depth sensing system 100 may include a projector 102 and a receiver 108. The projector 102 may be referred to as a "transmitter," "projector," "emitter," and so on, and should not be limited to a specific transmission component. Throughout the following disclosure, the terms projector and transmitter may be used interchangeably. The receiver 108 may be referred to as a "detector," "sensor," "sensing element," "photodetector," and so on, and should not be limited to a specific receiving component.

While the disclosure refers to the distribution as a light distribution, any suitable wireless signals at other frequencies may be used (such as radio frequency waves, sound waves, etc.). Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. However, the distribution may be organized in any way, and the present disclosure should not be limited to a specific type of distribution or type of wireless signal.

The transmitter 102 may be configured to project or transmit a distribution 104 of light points onto the scene 106. The white circles in the distribution 104 may indicate where no light is projected for a possible point location, and the black circles in the distribution 104 may indicate where light is projected for a possible point location. In some example implementations, the transmitter 102 may include one or more light sources 124 (such as one or more lasers), a lens 126, and a light modulator 128. The transmitter 102 also may include an aperture 122 from which the transmitted light escapes the transmitter 102. In some implementations, the transmitter 102 may further include a diffractive optical element (DOE) to diffract the emissions from one or more light sources 124 into additional emissions. In some aspects, the light modulator 128 (to adjust the intensity of the emission) may comprise a DOE. In projecting the distribution 104 of light points onto the scene 106, the transmitter 102 may transmit one or more lasers from the light source 124 through the lens 126 (and/or through a DOE or light modulator 128) and onto the scene 106. The transmitter 102 may be positioned on the same reference plane as the receiver 108, and the transmitter 102 and the receiver 108 may be separated by a distance called the baseline (112).

In some example implementations, the light projected by the transmitter 102 may be IR light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the transmitter. In the following description, other suitable wavelengths of light may be used. For example, light in portions of the visible light spectrum outside the IR light wavelength range or ultraviolet light. Alternatively, other signals with different wavelengths may be used, such as microwaves, radio frequency signals, and other suitable signals.

The scene 106 may include objects at different depths from the structured light system (such as from the transmitter 102 and the receiver 108). For example, objects 106A and 106B in the scene 106 may be at different depths. The receiver 108 may be configured to receive, from the scene 106, reflections 110 of the transmitted distribution 104 of light points. To receive the reflections 110, the receiver 108 may capture an image. When capturing the image, the receiver 108 may receive the reflections 110, as well as (i) other reflections of the distribution 104 of light points from other portions of the scene 106 at different depths and (ii) ambient light. Noise may also exist in the captured image.

In some example implementations, the receiver 108 may include a lens 130 to focus or direct the received light (including the reflections 110 from the objects 106A and 106B) on to the sensor 132 of the receiver 108. The receiver 108 also may include an aperture 120. Assuming for the example that only the reflections 110 are received, depths of the objects 106A and 106B may be determined based on the baseline 112, displacement and distortion of the light distribution 104 (such as in codewords) in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a distance (such as millimeters).

In some example implementations, the sensor 132 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 132 including an array of photodiodes, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of possible light points in the distribution 104. For example, the array of photodiodes or the CMOS sensor may include a number of photodiodes or a number of pixels, respectively, corresponding to the number of possible light points in the distribution 104. The sensor 132 logically may be divided into groups of pixels or photodiodes (such as 4×4 groups) that correspond to a size of a bit of a codeword. The group of pixels or photodiodes also may be referred to as a bit, and the portion of the captured image from a bit of the sensor 132 also may be referred to as a bit. In some example implementations, the sensor 132 may include the same number of bits as the distribution 104.

If the light source 124 transmits IR light (such as NIR light at a wavelength of, e.g., 940 nm), the sensor 132 may be an IR sensor to receive the reflections of the NIR light. The sensor 132 also may be configured to capture an image using a flood illuminator (not illustrated).

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating a depth map of the scene 106. Determining the depths may further include determining a displacement or a distortion of the distribution 104 in the reflections 110.

Although a number of separate components are illustrated in FIG. 1, one or more of the components may be implemented together or include additional functionality. All described components may not be required for an active depth sensing system 100, or the functionality of components may be separated into separate components. Additional components not illustrated also may exist. For example, the receiver 108 may include a bandpass filter to allow signals having a determined range of wavelengths to pass onto the sensor 132 (thus filtering out signals with a wavelength outside of the range). In this manner, some incidental signals (such as ambient light) may be prevented from interfering with the captures by the sensor 132. The range of the bandpass filter may be centered at the transmission wavelength for the transmitter 102. For example, if the transmitter 102 is configured to transmit NIR light with a wavelength of 940 nm, the receiver 108 may include a bandpass filter configured to allow NIR light having wavelengths within a range of, e.g., 920 nm to 960 nm. Therefore, the examples described regarding FIG. 1 is for illustrative purposes, and the present disclosure should not be limited to the example active depth sensing system 100.

For a light projector (such as the transmitter 102), the light source may be any suitable light source. In some example implementations, the light source 124 may include one or more distributed feedback (DFB) lasers. In some other example implementations, the light source 124 may include one or more vertical-cavity surface-emitting lasers (VCSELs).

A DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more lights points from one or more lasers and project an intended distribution with a greater number of light points than emitted by the one or more lasers. While the Figures may illustrate the depth of a DOE changing along only one axis of the DOE, the Figures are only to assist in describing aspects of the disclosure. The peaks and valleys of the surface of the DOE may be located at any portion of the surface of the DOE and cause any suitable change in the depth of portions of the DOE, and the present disclosure should not be limited to a specific surface configuration for a DOE.

If the light source 124 includes an array of lasers (such as a VCSEL array), a portion of the distribution of light points may be projected by the array. A DOE may be used to replicate the portion in projecting the distribution of light points. For example, the DOE may split the projection from the array into multiple instances, and the pattern of the projection may be a repetition of the projection from the array. In some example implementations, the DOE may be configured to repeat the projection vertically, horizontally, or at an angle between vertical and horizontal relative to the projection. The repeated instances may be overlapping, non-overlapping, or any suitable configuration. While the examples describe a DOE configured to split the projection from the array and stack the instances above and below one another, the present disclosure should not be limited to a specific type of DOE configuration and repetition of the projection.

Figure 2:
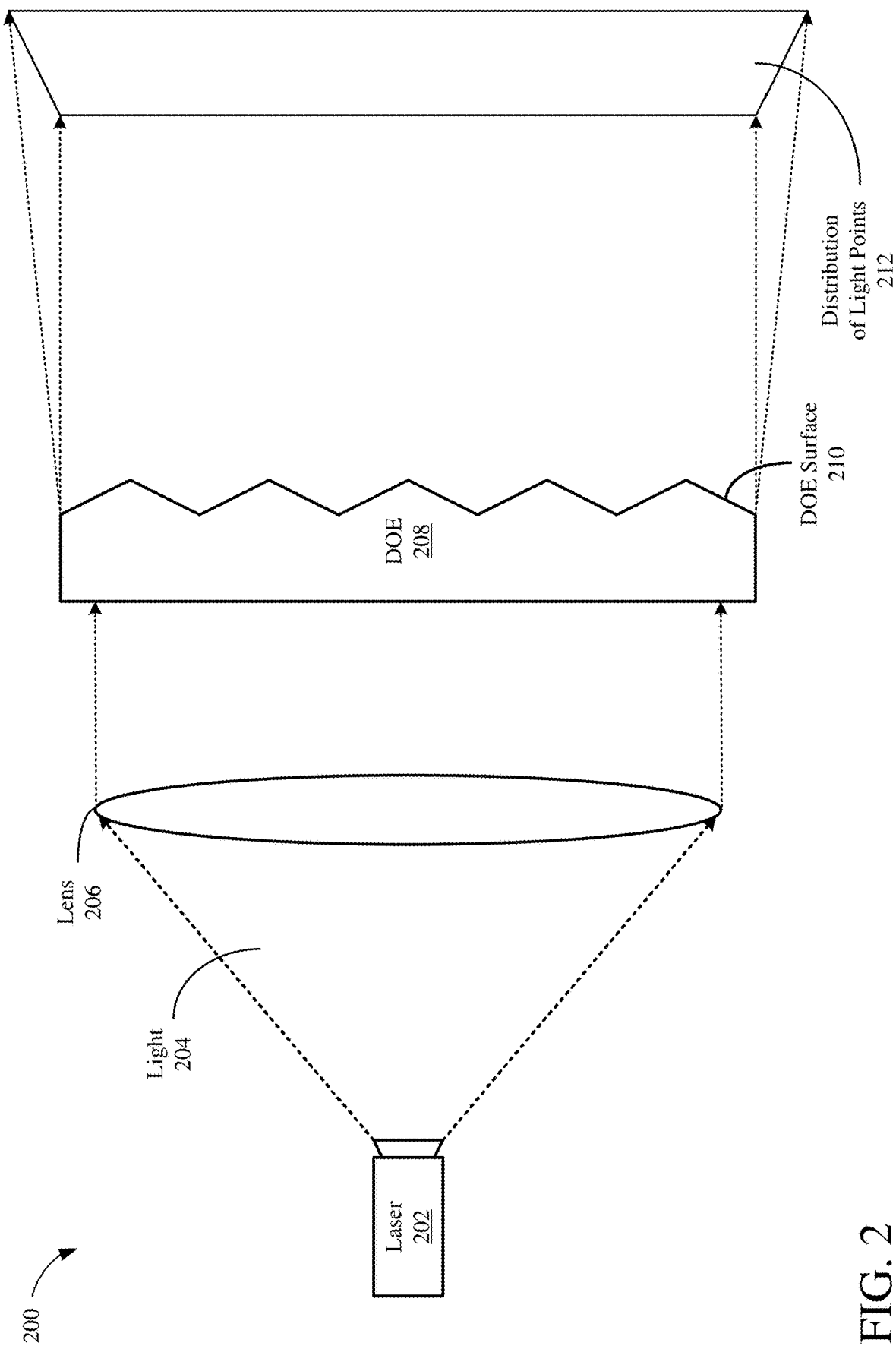
FIG. 2 is a depiction of an example projector of an active depth sensing system.

FIG. 2 is a depiction of an example projector 200 of an active depth sensing system. The projector 200 may be an example implementation of the transmitter 102 in FIG. 1. The example projector 200 may include a laser 202 that is configured to emit a light 204 toward a lens 206. The lens 206 may contain one or more lens elements to direct the light 204, and the lens 206 is shown only for illustrative purposes. An example laser 202 is a DFB laser, which may emit polarized light toward the lens 206. Another example laser 202 is a VCSEL, which may emit unpolarized light 204 toward the lens 206. The lens 206 may direct the light 204 toward the DOE 208. The DOE 208 may have a first refractive index, and a surface 210 of the DOE 208 may be configured for the DOE 208 to project the distribution of light points 212 from the light 204. Some example implementations of fabricating a DOE (such as DOE 208) include depositing a polymer layer or dielectric layer on a glass (or otherwise transparent) substrate. The deposited layer may have a desired refractive index and may be deposited with different depths, thus providing the desired characteristics for the DOE.

Figure 3:
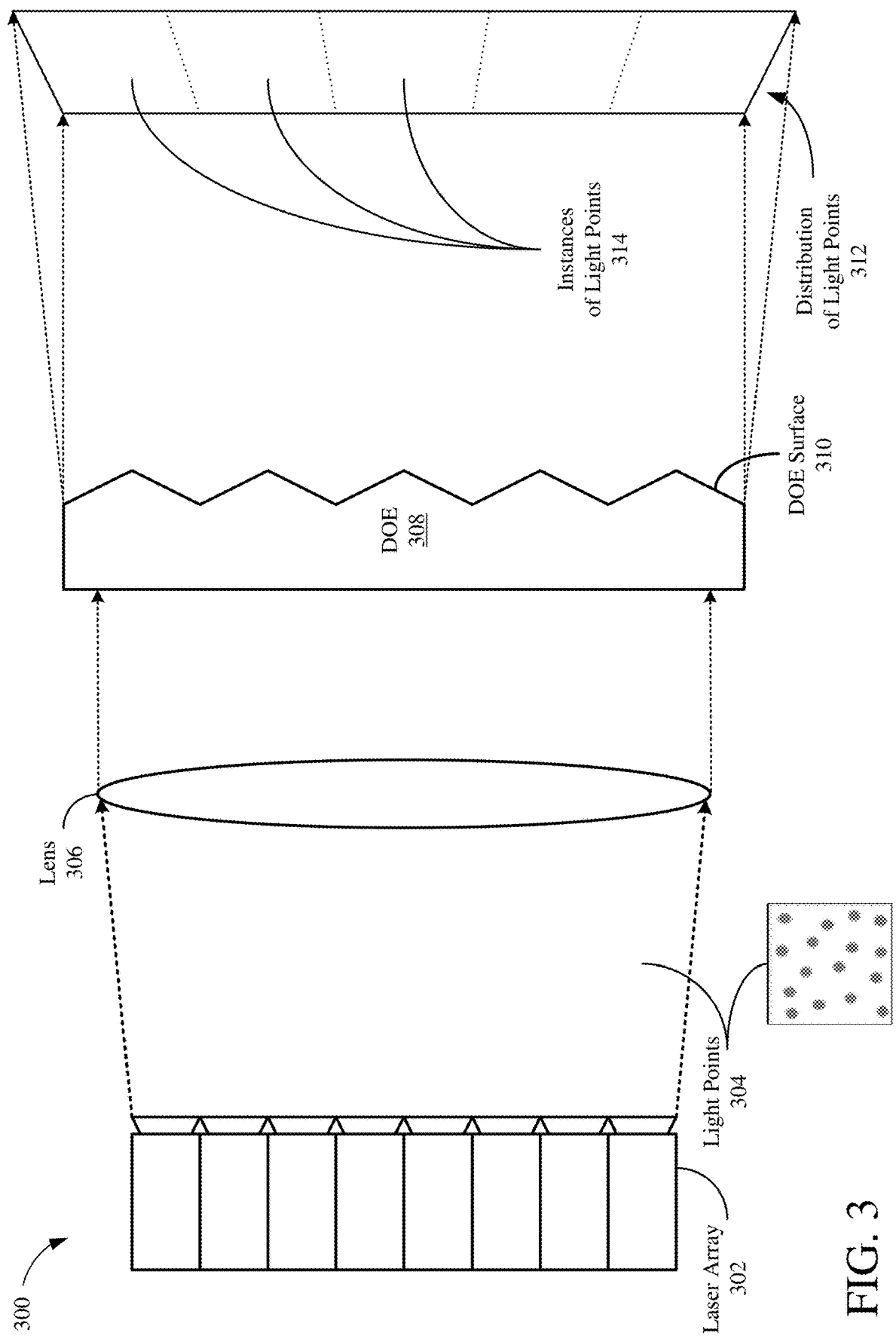
FIG. 3 is a depiction of another example projector of an active depth sensing system.

FIG. 3 is a depiction of another example projector 300 of an active depth sensing system. The projector 300 may be similar to the projector 200 in FIG. 2, except the projector 300 includes a plurality of lasers (such as a laser array 302) instead of one laser 202. The laser array 302 may emit a plurality of light points 304. The light points 304 may be in a pattern, with each point indicating a light emitted by one of the lasers in the laser array 302. The lens 306 may direct the light points 304 to the DOE 308 to project the distribution of light points 304 onto the scene. The DOE 308 may have a first refractive index, and the surface 310 of the DOE 308 may be configured for the DOE 308 to replicate the light points 304 into multiple instances of light points 314. The distribution of light points 312 therefore may include the multiple instances of light points 314. Each instance may be of the pattern of light points 304.

The DOE 308 may be configured to split the light points 304 into instances 314 and vertically stack the instances 314 in projecting the distribution 312. For example, the DOE 308 may include horizontal ridges for splitting the light points 304 vertically. While the example projector 300 is illustrated as vertically splitting and stacking the light points 304, the DOE 308 may be configured to divide the light points 304 and arrange the instances in any suitable manner. For example, the instances may be overlapping or spaced apart, stacked horizontally, tiled, or arranged in another suitable shape or order. The present disclosure should not be limited to a specific configuration for the DOE 308.

Referring to FIG. 2 and FIG. 3, the distribution 212 and the distribution 312 are unchanging for a fixed DOE 208 and DOE 308, respectively. However, the DOE 208 in FIG. 2 or the DOE 308 in FIG. 3 may be replaced with a configurable diffractive element that may be configured to adjust the distribution 212 or the distribution 312, respectively. For example, a configurable diffractive element may be configured to decrease or increase the number of light points in the distribution.

Figure 4:
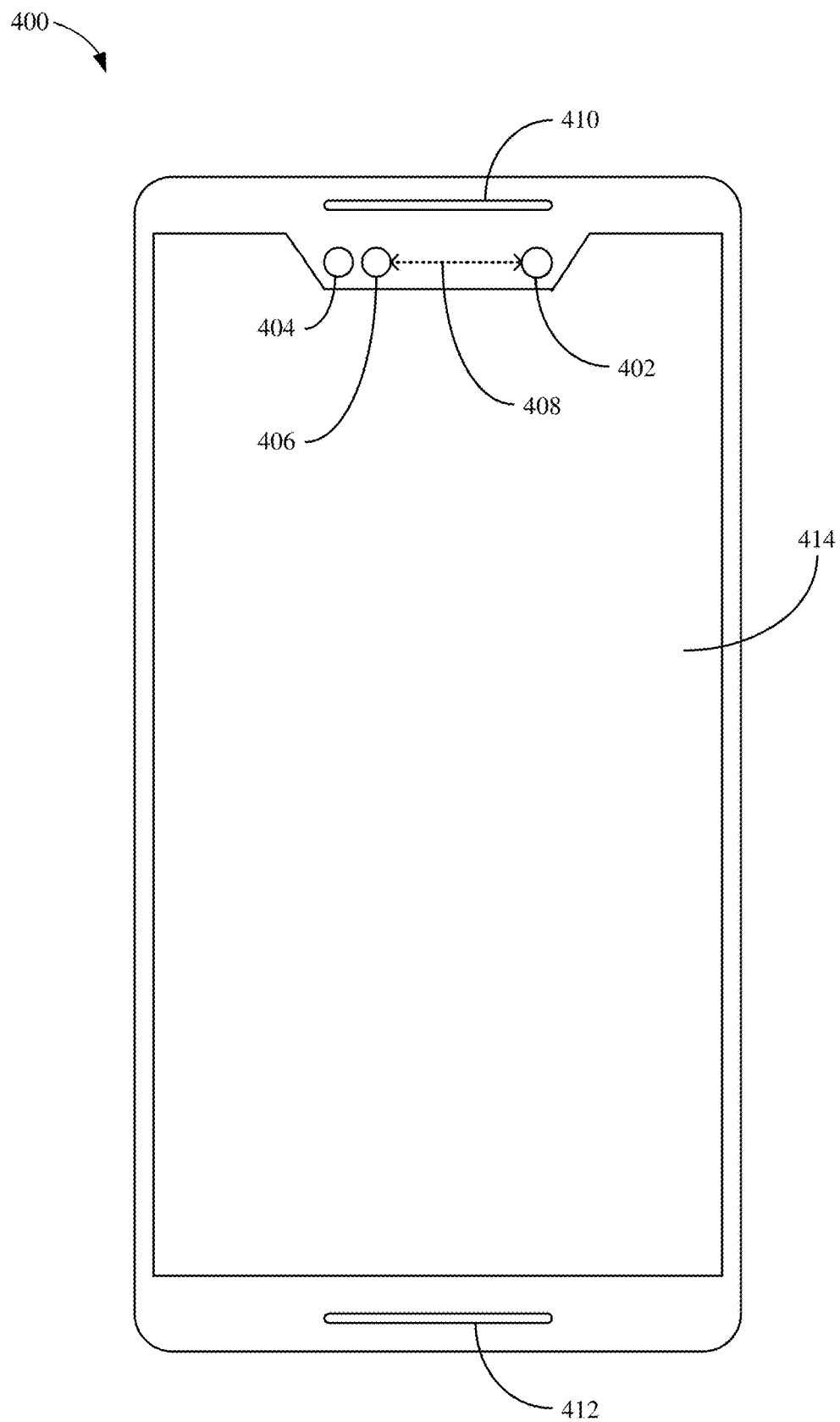
FIG. 4 is a depiction of an example device including an active depth sensing light projector and a flood illuminator.

In addition to active depth sensing, a device may be configured to provide flood illumination. FIG. 4 is a depiction of an example device 400 including an active depth sensing light projector 402 and a flood illuminator 404. The device 400 further may include an IR sensor 406 to capture an image based on the reflections of light from the active depth sensing light projector 402 or the flood illuminator 404 (with the projector 402 and the illuminator 404 projecting IR light). The structured light projector 402 and the IR sensor 406 may be separated by a baseline 408. An example device 400 may be a smartphone, with an earpiece 410 and a microphone 412 for conducting phone calls or other wireless communications. A smartphone also may include a display 414 with or without a notch including the projectors 402, illuminator 404, and the IR sensor 406.

Figure 5:
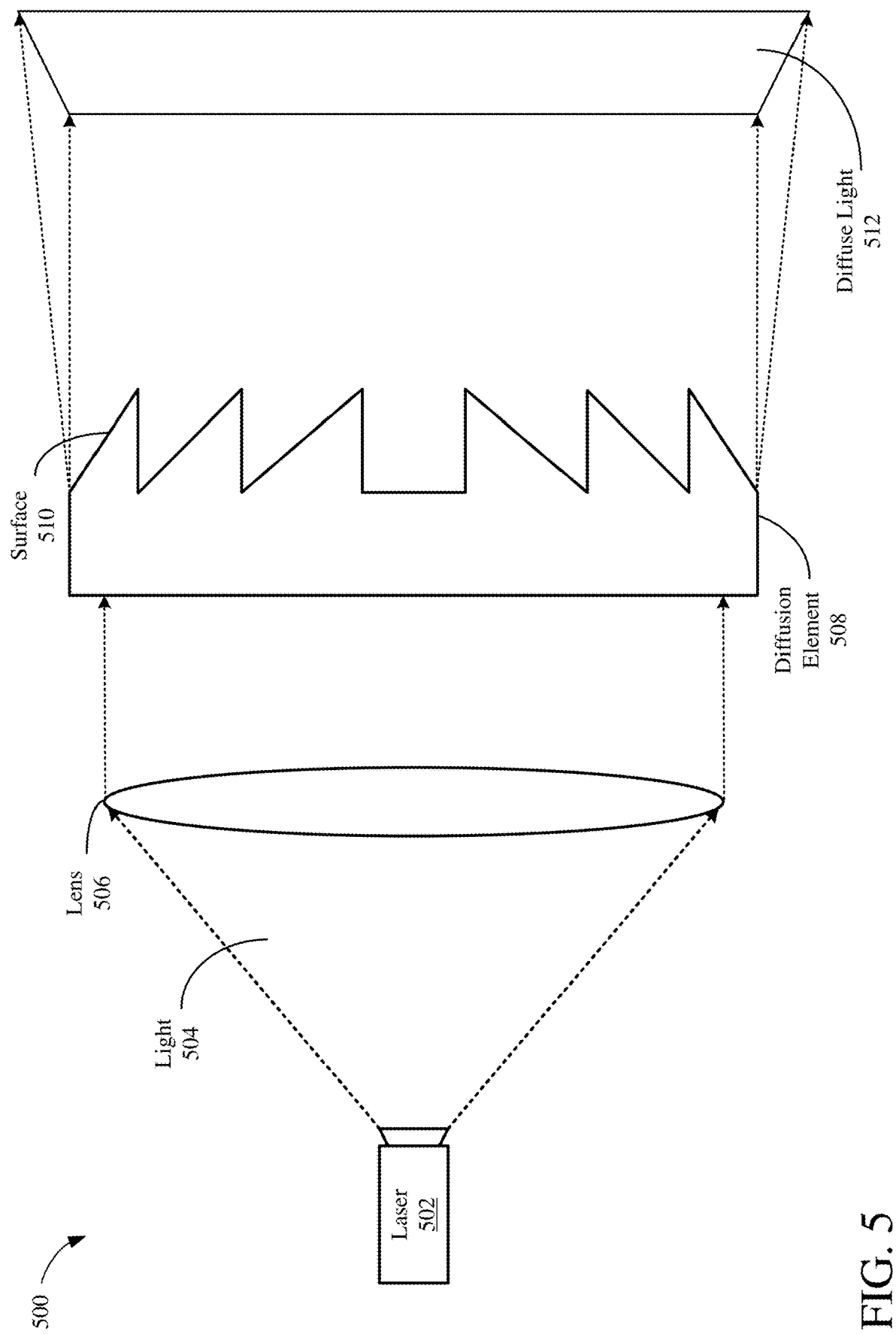
FIG. 5 is a depiction of an example flood illuminator.

A flood illuminator 404 may project a diffuse IR light onto a scene for the IR sensor 406 to capture an image based on reflections of the diffuse IR light. FIG. 5 is a depiction of an example flood illuminator 500. The flood illuminator 500 may be an example implementation of the flood illuminator 404 in FIG. 4. The flood illuminator 500 may include a Laser 502 (such as a DFB laser or a VCSEL) configured to emit light 504 toward a lens 506. The lens 506 may direct the light 504 to a diffusion element 508. The diffusion element 508 may have a refractive index and include a surface 510 configured to adjust the light passing through the diffusion element 508 such that the light projected from the diffusion element 508 is a diffuse light 512. An example diffusion element 508 is a Fresnel lens. However, any suitable diffusion element 508 may be used for diffusing the light 504.

Referring back to FIG. 4, a device 400 including an active depth sensing light projector 402 and a flood illuminator 404 would require at least two projectors. In some example implementations, the diffusion element 508 in FIG. 5 or the DOE 208 in FIG. 2 may be replaced with a configurable element so that a projector may be configured to project a diffuse light (when operating as a flood illuminator) and to project a distribution of light (when operating as a light projector for active depth sensing). In this manner, a device may include one projector for both flood illumination and active depth sensing. For example, the projector 402 of the device 400 in FIG. 4 may be configured to perform flood illumination and light projection for active depth sensing, and the device 400 therefore may not include the separate flood illuminator 404.

Figure 6:
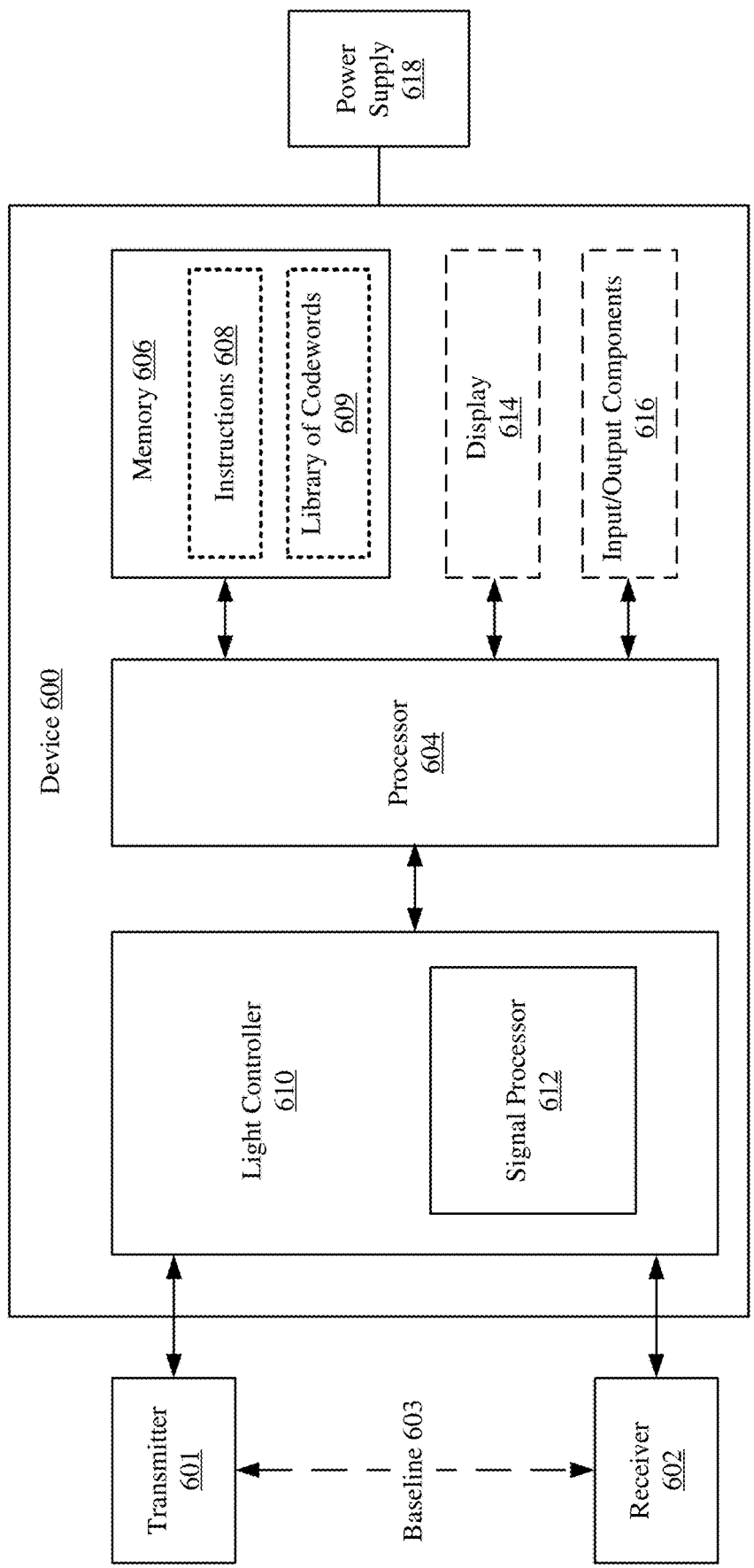
FIG. 6 is a block diagram of an example device including an adjustable diffraction projector.

If a device includes a projector that is configurable to adjust the density of a light distribution for different operating modes, and/or if the device includes a projector that is configurable to switch between flood illumination and light projection for active depth sensing for different operating modes, the device may control configuring and operating the projector for the different operating modes. FIG. 6 is a block diagram of an example device 600 for configuring a transmitter 601 for active depth sensing (which may project different density distributions of light) and/or flood illumination. In some other examples, a transmitter may be separate from and coupled to the device 600.

The example device 600 may include or be coupled to a transmitter 601 and a receiver 602 separated from the transmitter 601 by a baseline 603. The receiver 602 may be an IR sensor configured to capture images, and the transmitter 601 may be a projector configured to project a distribution of light and/or a diffuse light. The density of the distribution of light from the transmitter 601 may be adjustable.

The example device 600 also may include a processor 604, a memory 606 storing instructions 608, and a light controller 610 (which may include one or more signal processors 612). The device 600 may optionally include (or be coupled to) a display 614 and a number of input/output (I/O) components 616. The device 600 may include additional features or components not shown. For example, a wireless interface, which may include a number of transceivers and a baseband processor, may be included for a wireless communication device to perform wireless communications. In another example, the device 600 may include one or more cameras (such as a contact image sensor (CIS) camera or other suitable camera for capturing images using visible light). The transmitter 601 and the receiver 602 may be part of an active depth sensing system (such as the system 100 in FIG. 1) controlled by the light controller 610 and/or the processor 604. The transmitter 601 and the receiver 602 additionally may be a flood illumination and capture system. The device 600 may include or be coupled to additional light projectors (or flood illuminators) or may include a different configuration for the light projectors. The device 600 also may include or be coupled to additional receivers (not shown) for capturing multiple images of a scene. The disclosure should not be limited to any specific examples or illustrations, including the example device 600.

The memory 606 may be a non-transient or non-transitory computer readable medium storing computer-executable instructions 608 to perform all or a portion of one or more operations described in this disclosure. If the light distribution projected by the transmitter 601 is divided into codewords, the memory 606 optionally may store a library of codewords 609 for the codeword distribution of light. The library of codewords 609 may indicate what codewords exist in the distribution and the relative location between the codewords in the distribution. The device 600 also may include a power supply 618, which may be coupled to or integrated into the device 600.

The processor 604 may be one or more suitable processors capable of executing scripts or instructions of one or more software programs (such as instructions 608 stored within the memory 606). In some aspects, the processor 604 may be one or more general purpose processors that execute instructions 608 to cause the device 600 to perform any number of functions or operations. In additional or alternative aspects, the processor 604 may include integrated circuits or other hardware to perform functions or operations without the use of software. While shown to be coupled to each other via the processor 604 in the example of FIG. 6, the processor 604, the memory 606, the light controller 610, the optional display 614, and the optional I/O components 616 may be coupled to one another in various arrangements. For example, the processor 604, the memory 606, the light controller 610, the optional display 614, and/or the optional I/O components 616 may be coupled to each other via one or more local buses (not shown for simplicity).

The display 614 may be any suitable display or screen allowing for user interaction and/or to present items (such as a depth map, a preview image of the scene, a lock screen, etc.) for viewing by a user. In some aspects, the display 614 may be a touch-sensitive display. The I/O components 616 may be or include any suitable mechanism, interface, or device to receive input (such as commands) from the user and to provide output to the user. For example, the I/O components 616 may include (but are not limited to) a graphical user interface, keyboard, mouse, microphone and speakers, squeezable bezel or border of the device 600, physical buttons located on device 600, and so on. The display 614 and/or the I/O components 616 may provide a preview image or depth map of the scene to a user and/or receive a user input for adjusting one or more settings of the device 600 (such as for adjusting the density of the distribution projected by the transmitter 601, switching the projection from diffuse light to a distribution of light points by the transmitter 601, etc.).

The light controller 610 may include a signal processor 612, which may be one or more processors to configure the transmitter 601 and process images captured by the receiver 602. In some aspects, the signal processor 612 may execute instructions from a memory (such as instructions 608 from the memory 606 or instructions stored in a separate memory coupled to the signal processor 612). In other aspects, the signal processor 612 may include specific hardware for operation. The signal processor 612 may alternatively or additionally include a combination of specific hardware and the ability to execute software instructions. While the following examples may be described in relation to the device 600, any suitable device or configuration of device components may be used, and the present disclosure should not be limited by a specific device configuration.

For the projector (such as the transmitter 601 in FIG. 6), the diffractive element may be configured so that the light projection is adjustable. To be configurable to adjust the light projection, the diffractive element may include a plurality of DOEs. In some example implementations, a diffusion element (for flood illumination) may be one of the DOEs. In some other example implementations, two or more DOEs may cause the final light projection to have different light distributions for active depth sensing. In some examples, the multiple DOEs are positionally fixed (do not move) within the projector or relative to the light source, and other projector components may be adjusted when adjusting the light projection. While the following examples describe two DOEs for the projector, any number of DOEs may be used, and the present disclosure should not be limited to a projector including two DOEs.

FIG. 7A is a depiction of an example arrangement 700 of two DOEs for a projector. The DOEs may include a DOE for distributed light projection and a diffusion element/DOE for flood illumination. The DOEs may be aligned in the projection path of light from a light source of the projector, and the uneven surfaces of the DOEs (indicated by the jagged lines) may be oriented in the same direction (as illustrated). FIG. 7B is a depiction of another example arrangement 710 of two DOEs for a projector. The arrangement 710 is similar to the arrangement 700 in FIG. 7A, except that the uneven surfaces of the DOEs may be oriented toward each other.

FIG. 7C is a depiction of a further example arrangement 720 of two DOEs for a projector. The DOEs may include two DOEs for different distributions of light projection (for active depth sensing). The uneven surfaces of the DOEs may be the same. Alternatively, the uneven surfaces of the DOEs may be different. In one example, the uneven surfaces of the DOEs may be the same, except the surface of one DOE may be spatially shifted so that the similar surfaces do not align on the projection path of the light. In another example, the uneven surfaces may be different (such as a different number of peaks and valleys and thus a differing number and/or size of depths of the DOEs). Similar to FIG. 7A, the uneven surfaces of the DOEs may be oriented in the same direction. FIG. 7D is a depiction of another example arrangement 730 of two DOEs for a projector. The arrangement 730 is similar to the arrangement 720 in FIG. 7C, except that the uneven surfaces of the DOEs may be oriented toward each other.

Referring back to FIG. 7A and FIG. 7B, the diffusion element is illustrated as after a DOE for distributed light projection (with light passing from left to right through the elements). In some alternative implementations, the diffusion element may be before the distributed light projection DOE along the light path. FIG. 7E is a depiction of another example arrangement 740 of two DOEs for a projector. The arrangement 740 is similar to the arrangement 700 in FIG. 7A, except that the order of the DOEs is switched. FIG. 7F is a depiction of a further example arrangement 750 of two DOEs for a projector. The arrangement 750 is similar to the arrangement 710 in FIG. 7B, except that the order of the DOEs is switched.

For FIGS. 7A-7F, the uneven surface of the first DOE (e.g., the left DOE for a direction of the light from left to right) is oriented toward the subsequent (right) DOE. In some other example implementations, the uneven surface of the first DOE may be oriented toward the light source (away from the subsequent DOE). FIG. 7G-FIG. 7I are depictions of further example arrangements 760-780 of two DOEs for a projector. The arrangements 760, 770, and 780 in FIG. 7G-FIG. 7I are similar to the arrangements 710, 730, and 750 in FIG. 7B, FIG. 7D, and FIG. 7F, respectively, except that the first DOE is oriented in the opposite direction (with the uneven surface oriented toward a light source instead of the other DOE).

For multiple DOEs in a projector, the refractive index of each DOE may be different from one another. For example, the first DOE in FIGS. 7A-7I may have a first refractive index, and the second DOE may have a second refractive index different than the first refractive index. For example, the refractive indexes may be different if they are significantly different (e.g., the difference is greater than a threshold). In this manner, the difference in refraction between the DOEs may be perceptible or substantial for operating purposes. In some example implementations, DOEs may be spaced apart from each other. While the following examples describe two DOEs having the uneven surfaces oriented toward each other, other orientations of the DOEs may be used (such as any of the orientations in FIGS. 7A-7I), and the present disclosure should not be limited to the following examples in orienting the DOEs.

The space between the two DOEs may be filled with a transparent or translucent material having different refractive indexes than the two DOEs. For example, the differences between the refractive index for the material and the two DOEs are greater than a threshold (and the differences may be perceptible or substantial for operating purposes). In some example implementations, the refractive index may be switchable for the material. Additionally or alternatively, the refractive index for the material may differ for different polarities of light passing through the material.

Figure 8:
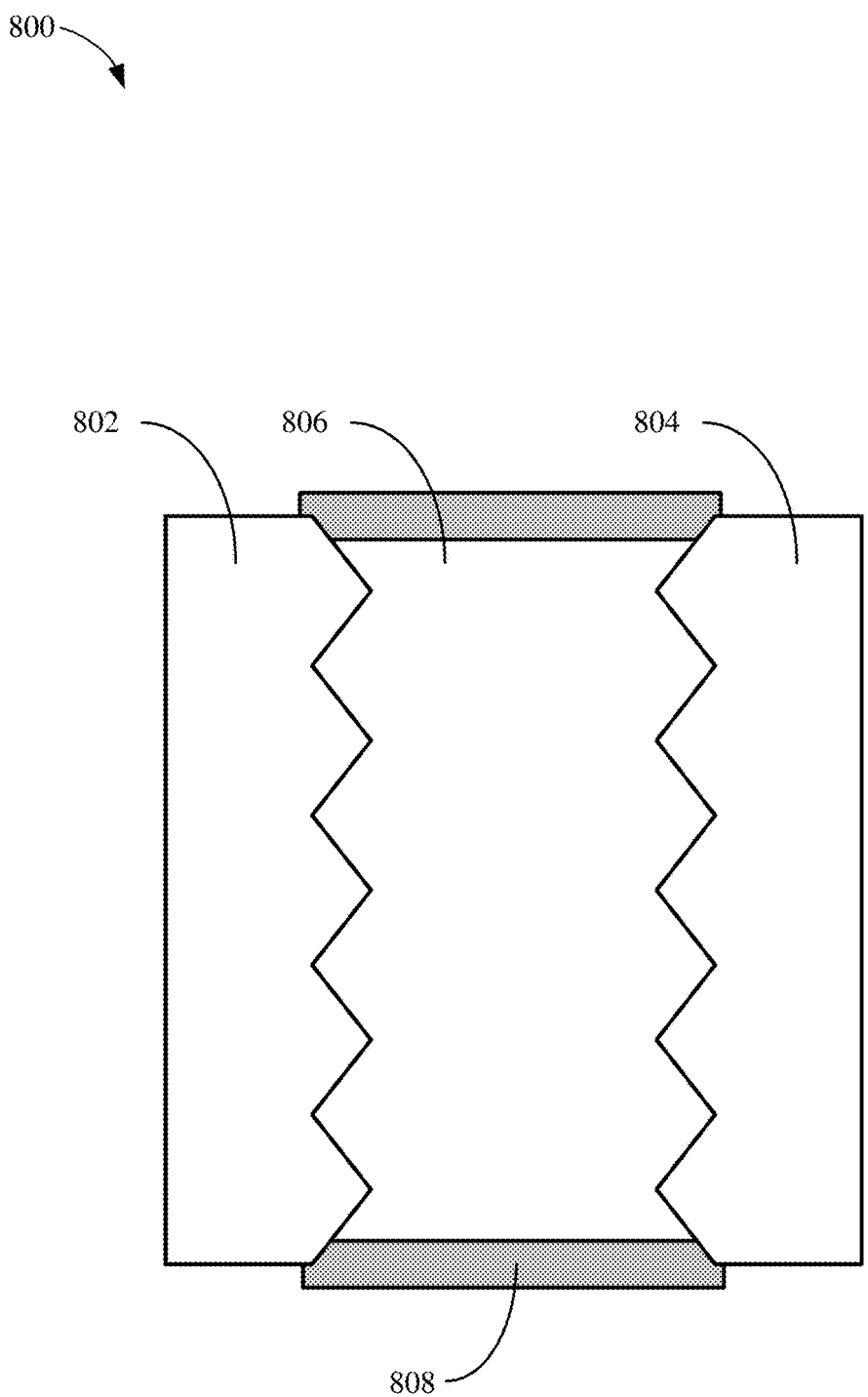
FIG. 8 is a depiction of an example diffractive element including an arrangement of two diffractive optical elements with a refractive material between the two diffractive optical elements (DOE).

FIG. 8 is a depiction of a diffractive element 800 including two DOEs 802 and 804 with a refractive material 806 in between. The DOEs 802 and 804 may be spaced apart by spacers 808. Alternatively, the refractive material 806 may be sufficient to separate the DOEs 802 and 804 (such as having a sufficient structure or inelasticity). In some example implementations, the refractive material 806 may have an average refractive index different (e.g., the differences being greater than a threshold) than the refractive indexes for the DOEs 802 and 804. If the refractive indexes are different for the first DOE 802, the second DOE 804, and the refractive material 806 (e.g., the differences being greater than a threshold), light passing through the DOEs 802 and 804 and the refractive material 806 may be affected by both DOEs 802 and 804. For example, if the first DOE 802 splits a light from a laser into a first distribution of light points, the first distribution of light points may pass through the refractive material 806 to the second DOE 804. If the second DOE 804 splits a light into a second distribution of light points, each light point of the first distribution of light points may be split into a separate second distribution of light points. In this manner, the number of light points of the first distribution from the first DOE 802 may be increased by the second DOE 804.

When a light point is divided into multiple light points, the energy is divided among the multiple light points. As a result, the intensity of each of the resulting light points is less than the intensity of the original light point. In this manner, the distribution of, e.g., points of light may be denser without the intensity of the light for a portion of the distribution increasing (thus allowing an overall maximum intensity of the projected light to remain below an overall maximum intensity while increasing the density of light points for the projected light).

If the refractive index of the refractive material 806 is the same as a first refractive index of the first DOE 802 or a second refractive index of the second DOE 804, light may not be affected by the DOE with the same refractive index as the refractive material 806. Same refractive indexes may be similar refractive indexes, such as the difference between the refractive indexes being less than a threshold. For example, refractive indexes may be the same for two refractive indexes whose difference is less than the threshold and different for two refractive indexes whose difference is greater than the threshold. The following description uses the terms "different," "same," and "similar." However, "different" may be a difference greater than an absolute difference (e.g., the differences being greater than a determined threshold), and "same" or "similar" may not be absolutely the same (e.g., the differences may be less than a determined threshold or the differences are not perceptible for operation of the device). The present disclosure should not be limited to a specific difference or similarity through use of the terms.

Figure 9A:
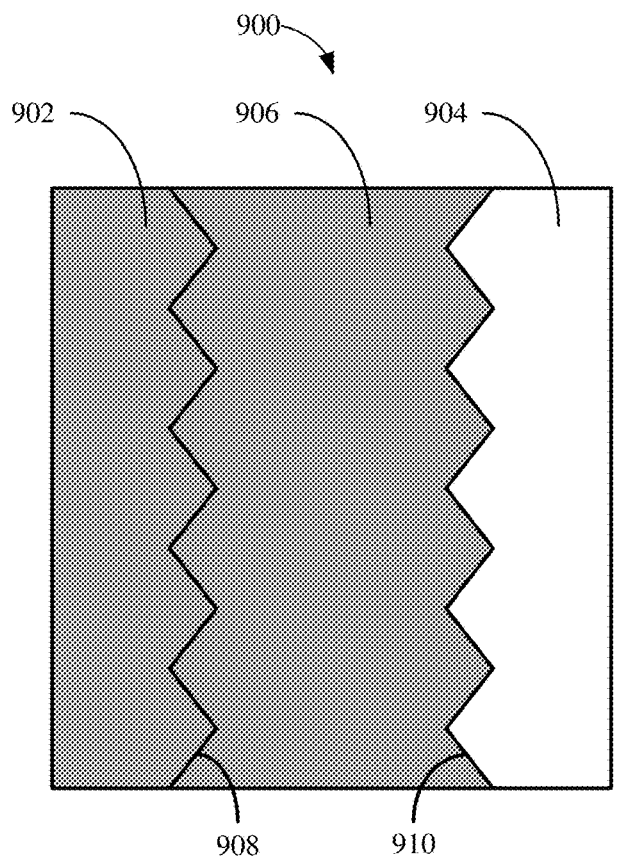
FIG. 9A is a depiction of two example DOEs with a refractive material in between, where a first DOE and the refractive material have the same refractive index.
Figure 9B:
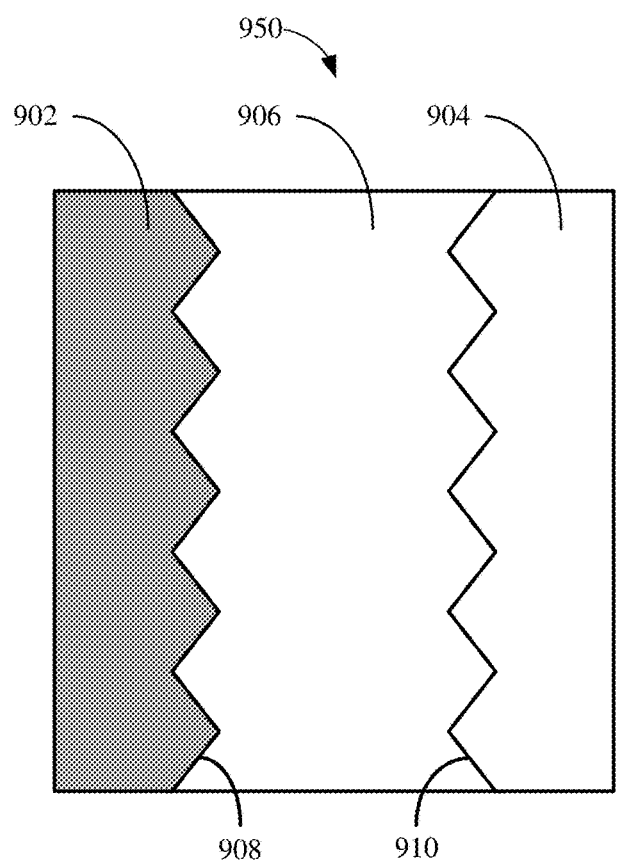
FIG. 9B is a depiction of the two example DOEs with the refractive material in between in FIG. 9A, where the second DOE and the refractive material have the same refractive index.

FIG. 9A is a depiction 900 of two DOEs 902 and 904 with a refractive material 906 in between. The refractive index of the first DOE 902 and the refractive index of the refractive material 906 may be the same (e.g., the differences being less than a threshold). In this manner, the surface 908 may seem to be non-existent to light passing through the first DOE 902 and the refractive material 906. As a result, the distribution of light passing through the diffractive element is only affected by the second DOE 904 with the surface 910. FIG. 9B is a depiction 950 of the two DOEs 902 and 904 with the refractive material 906 in between. The refractive index of the second DOE 904 and the refractive index of the material 906 may be the same (e.g., the differences being less than a threshold). In this manner, the surface 910 may seem to be non-existent to light passing through the material 906 and the second DOE 904. As a result, the distribution of light passing through the diffractive element is only affected by the first DOE 904 with the surface 908.

Figure 9C:
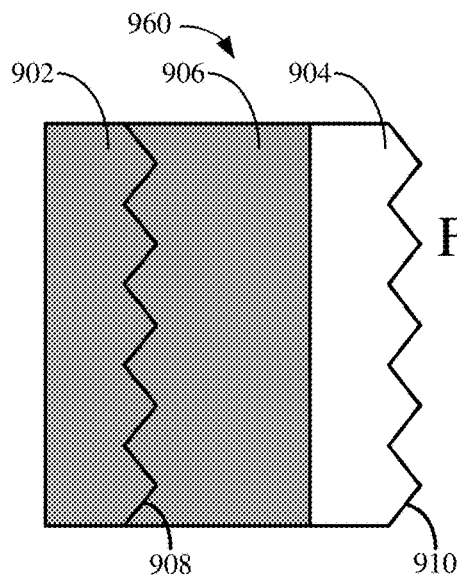
FIG. 9C is a depiction of two example DOEs with the refractive material in between, where the uneven surface of the second DOE is oriented away from the refractive material, and the first DOE and the refractive material have the same refractive index.
Figure 9D:
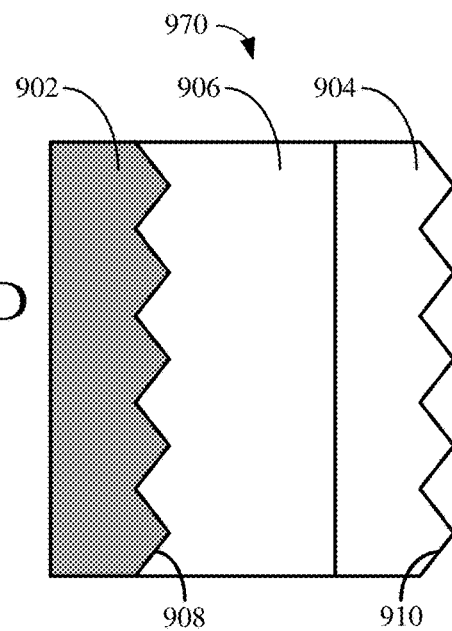
FIG. 9D is a depiction of the two example DOEs with the refractive material in between, where the uneven surface of the second DOE is oriented away from the refractive material, and the second DOE and the refractive material have the same refractive index.

In some other example orientations for the DOE 902 and the DOE 904 (which either may be for projecting a distribution of light for active depth sensing or for flood illumination), the uneven surfaces 908 and 910 may be oriented in the same direction. FIG. 9C is a depiction 960 of two DOEs 902 and 904 with the material 906 in between and the uneven surfaces 908 and 910 oriented away from a light source (with the light travelling from left to right). The refractive index of the first DOE 902 and the refractive index of the refractive material 906 may be the same (e.g., the differences being less than a threshold). In this manner, the surface 908 may seem to be non-existent to light passing through the first DOE 902 and the material 906. As a result, the light is only affected by the second DOE 904 with the surface 910. FIG. 9D is a depiction 970 of the two DOEs 902 and 904 with the material 906 in between and the uneven surfaces 908 and 910 oriented away from a light source (with the light travelling from left to right). The refractive index of the first DOE 902 and the refractive index of the refractive material 906 are different (e.g., the differences being greater than a threshold). The refractive index of the second DOE 904 and the refractive index of the refractive material 906 may be the same or different. In this manner, both surfaces 908 and 910 may affect the distribution of light passing through the diffractive element.

Figure 9E:
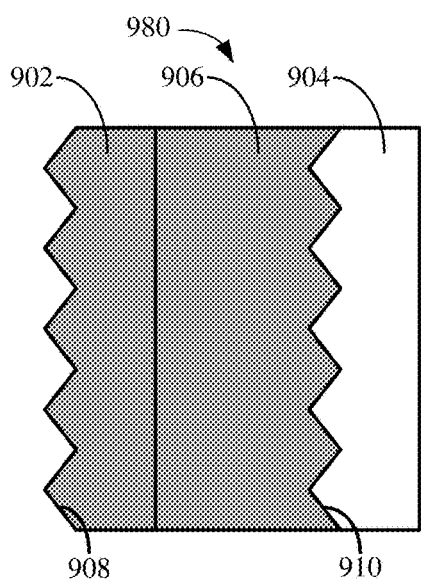
FIG. 9E is a depiction of two example DOEs with the refractive material in between, where the uneven surface of the first DOE is oriented away from the refractive material, and the first DOE and the refractive material have the same refractive index.
Figure 9F:
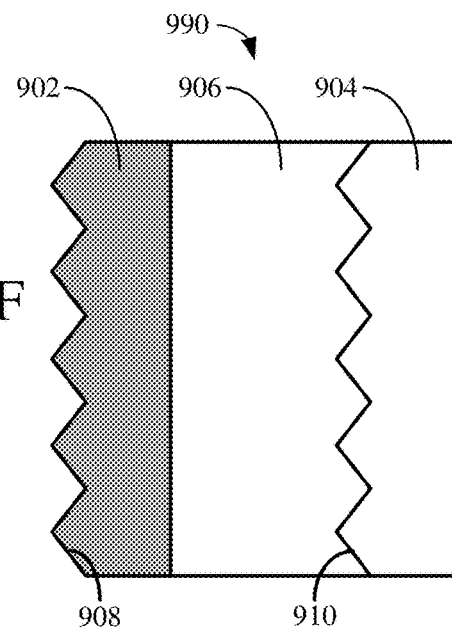
FIG. 9F is a depiction of the two example DOEs with the refractive material in between, where the uneven surface of the first DOE is oriented away from the refractive material, and the second DOE and the refractive material have the same refractive index.

FIG. 9E is a depiction 980 of two DOEs 902 and 904 with the material 906 in between and the uneven surfaces 908 and 910 oriented toward a light source (with the light travelling from left to right). The refractive index of the second DOE 904 and the refractive index of the refractive material 906 are different (e.g., the differences being greater than a threshold). The refractive index of the first DOE 902 and the refractive index of the refractive material 906 may be different (e.g., the differences being greater than a threshold). In this manner, both surfaces 908 and 910 may affect the distribution of light passing through the diffractive element. FIG. 9F is a depiction 990 of the two DOEs 902 and 904 with the material 906 in between and the uneven surfaces 908 and 910 oriented away from a light source. The refractive index of the second DOE 904 and the refractive index of the material 906 may be the same. In this manner, the surface 910 may seem to be non-existent to light passing through the material 906 and the second DOE 904. As a result, the distribution of light passing through the diffractive element is only affected by the first DOE 904 with the surface 908. Other suitable arrangements and orientations of two or more DOEs may be used, and the present disclosure should not be limited to the examples in FIGS. 9A-9F.

In some example implementations, the projector may be configured to adjust the refractive index of the refractive material with respect to the light passing through the diffractive element. In this manner, the refractive index of the refractive material 906 may appear to be the same as one of the DOEs 902 or 904 in some instances or operating modes and different than the DOE 902 or 904 in other instances or operating modes. Through adjusting the refractive index of the refractive material 906, the projector may be configured to switch between generate light distributions from each of the DOEs, or the projector may be configured between using one DOE and using two DOEs to generate the light distribution.

In some example implementations, the refractive index of the refractive material may be based on the polarity of the light passing through the material. For example, a light with a first polarity may be associated with a first refractive index while a light with a second polarity may be associated with a second refractive index for the refractive material 906. In some example implementations, the material may be a birefringent material, with the two refractive indexes being the refractive indexes of the two DOEs on either side of the material. A first refractive index of the material may be for polarized light with light waves in a first linear direction. A second refractive index of the material may be for polarized light with light waves in a second linear direction 90 degrees to the first linear direction.

Figure 10:
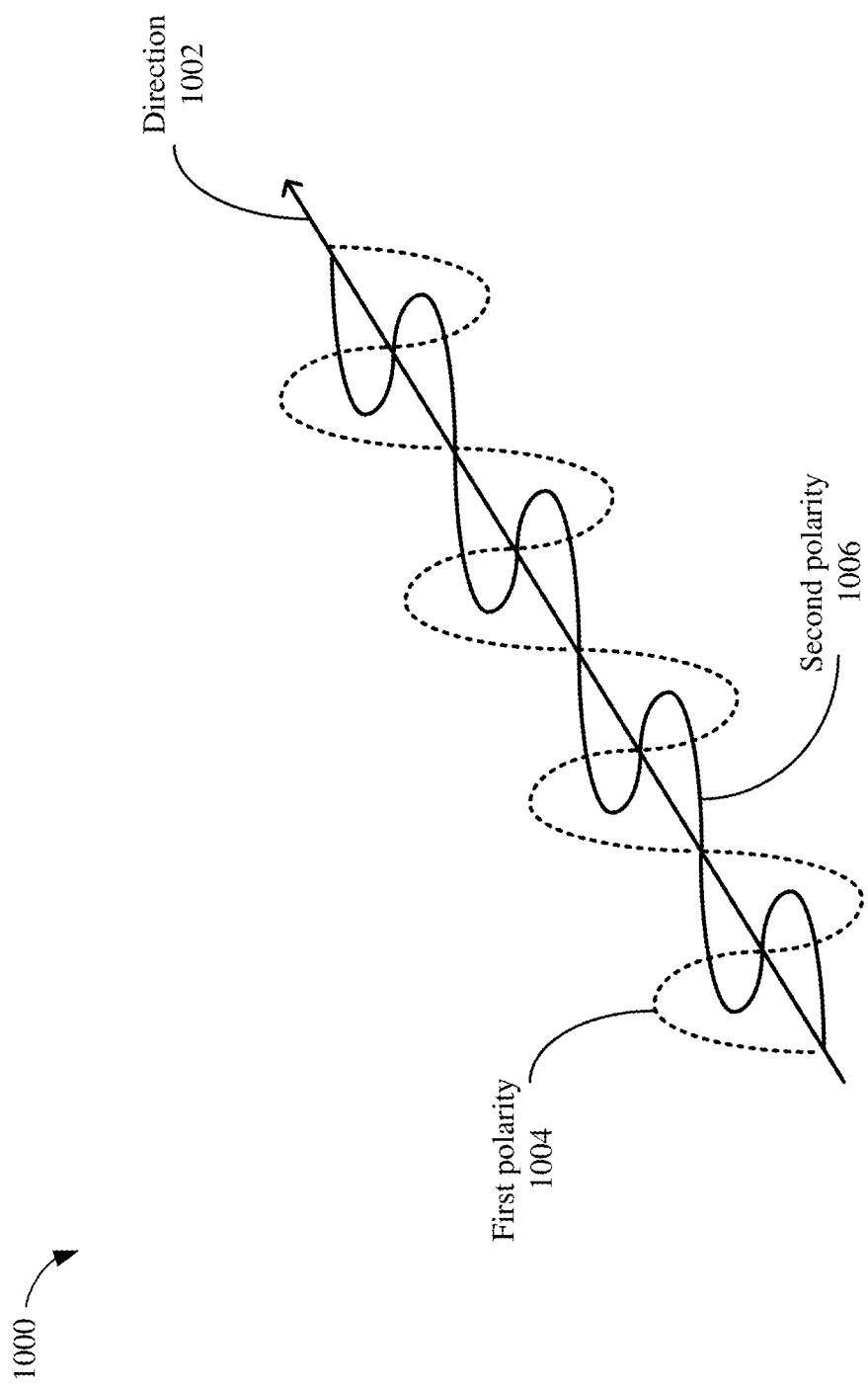
FIG. 10 is a depiction of example polarization orientations including a first polarity and a second polarity ninety degrees from each other.

FIG. 10 is a depiction 1000 of an example waveform for a first polarity 1004 and an example waveform for a second polarity 1006 ninety degrees to the first polarity 1004 for light travelling in direction 1002. The material having a first refractive index for the first polarity 1004 may alter polarized light with the first polarity 1004 passing through the material based on the first refractive index. The material having a second refractive index for the second polarity 1006 may alter polarized light with the second polarity 1006 passing through the material based on the second refractive index.

Unpolarized light travelling along direction 1002 includes light with waveforms in any plane on the direction 1002. For example, a portion of the unpolarized light has a first polarity 1004, another portion of the unpolarized light has a second polarity 1006, and other portions of the unpolarized light have polarities between the first polarity 1004 and the second polarity 1006. Each of the portions of light can be modeled as including a first energy with a first polarity 1004 and including a second energy with a second polarity 1006. For example, light with a polarity 45 degrees to the first polarity 1004 and the second polarity 1006 may be modeled as having half of its energy with the first polarity 1004 and having the other half of its energy with the second polarity 1006. Other portions of the unpolarized light may be modeled similarly. For a material with the first and second refractive indexes based on the polarity of the light, the first energy of the light may be altered based on the first refractive index, and the second energy of the light may be altered based on the second refractive index.

The DOE on either side of the birefringent material also may have a refractive index that is based on the polarity of the light passing through the DOE. For example, referring back to FIGS. 9A and 9B, the first DOE 902 may have a refractive index that is identical to the first refractive index of the birefringent material 906 for light of a first polarity 1004 (FIG. 10), and the second DOE 904 may have a refractive index that is identical to the second refractive index of the birefringent material 906 for light of a second polarity 1006 (FIG. 10). The DOEs 902 and 904 may not affect or alter light with a polarity associated with the refractive index of the material 906 that is identical to the refractive index of the respective DOE 902 or 904. In this manner, if light passing through the elements 902-906 includes a first energy with a first polarity 1004 and a second energy with a second polarity 1006, the first energy of the light may be affected or altered based on the surface 910 of the second DOE 904 (similar to FIG. 9A, with the first DOE 902 appearing as invisible for the first energy of the light). Similarly, the second energy of the light may be affected or altered based on the surface 908 of the first DOE 902 (similar to FIG. 9B, with the second DOE 904 appearing as invisible for the second energy of the light).

If the first DOE 902 distributes (or replicates) light from a light source (such as a laser or a laser array) into a first distribution of light points, the second energy of the light is divided into the light points of the first distribution. If the second DOE 904 distributes (or replicates) light from a light source (such as a laser or a laser array) into a second distribution of light points, the first energy of the light is divided into the light points of the second distribution. The first distribution and the second distribution may be interleaved or otherwise combined (such as without any points between the distributions overlapping) to generate the final distribution for the projector. While the examples use the first polarity 1004 and the second polarity 1006 in FIG. 10, any perpendicular polarities along a direction may be used, and the example polarities are provided for ease of explanation. The present disclosure should not be limited to specific directions for the polarities regarding the refractive indexes.

Unpolarized light (or polarized light 45 degrees to the first polarity 1004 and the second polarity 1006) can be modeled as having half of its energy with the first polarity 1004 and having the other half of its energy with the second polarity 1006. Unpolarized light (or 45 degree polarized light) passing through the three elements 902-906 has half of its energy divided into the first distribution of light points (based on the first DOE 902) and has the other half of its energy divided into the second distribution of light points (based on the second DOE 904) based on the birefringent properties of the material 906. If the first distribution and the second distribution include the same number of light points, each light point of the final distribution may have the same energy as any other light point of the final distribution. Alternatively, if the number of light points differ between the first distribution and the second distribution, a light point from the first distribution may have a different energy than a light point from the second distribution. The difference in energy between the light points may be based on the number of light points in the first distribution relative to the number of light points in the second distribution.

Figure 11:
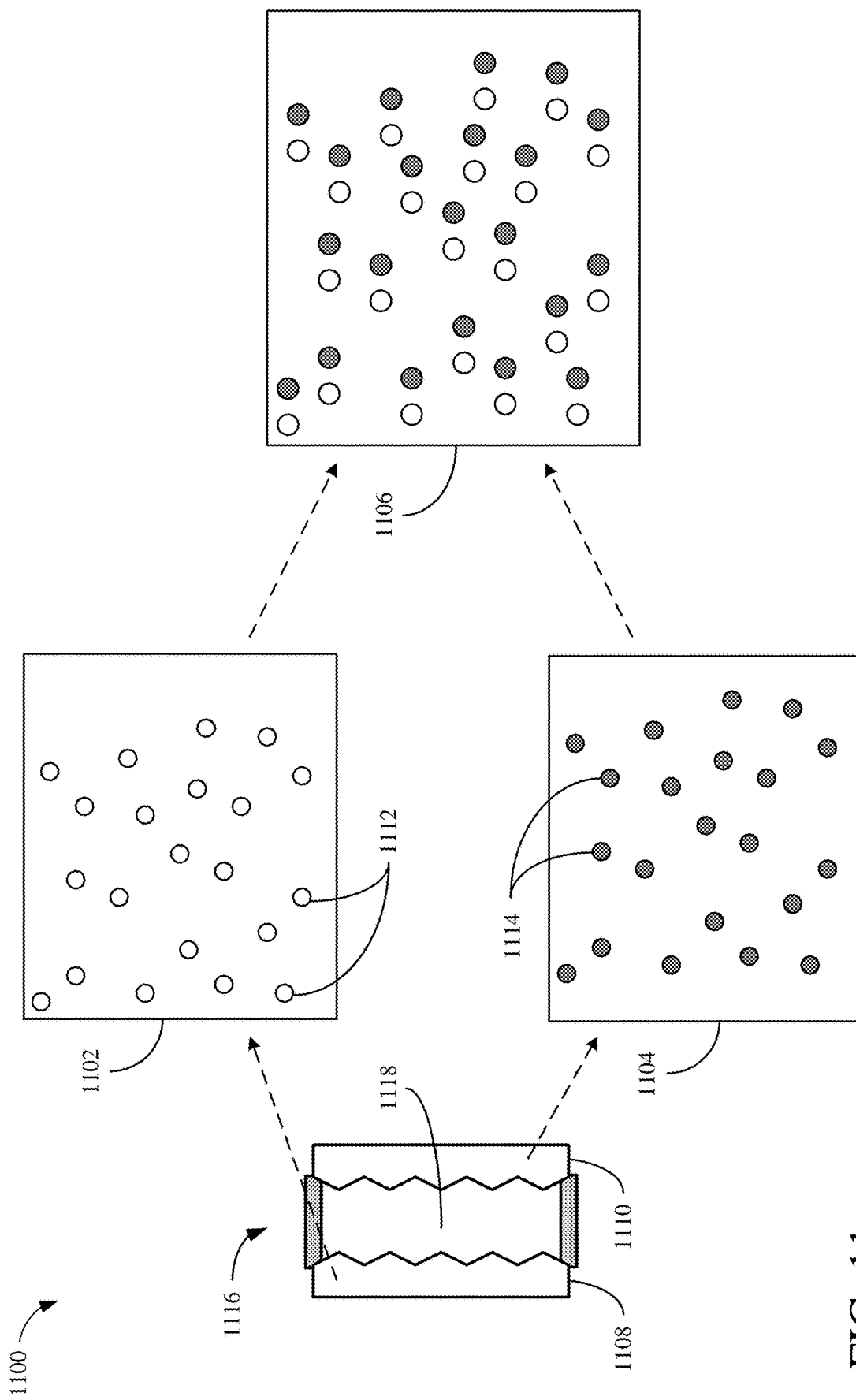
FIG. 11 is a depiction of example first and second distributions combined for a combined distribution.

FIG. 11 is a depiction 1100 of example first and second distributions 1102 and 1104 combined for a combined (or final) distribution 1106. While the orientation of the DOEs 1108 and 1110 (and for the DOEs in FIGS. 12-14) are illustrated as having the uneven surfaces oriented toward one another, any suitable orientation of the DOEs may be used. For example, the surfaces may be oriented in one direction (such as in any arrangement in FIGS. 7A-7I). The present disclosure should not be limited by the specific example in FIG. 11, or the examples in FIGS. 12-14.

For light passing from left to right through the diffractive element 1116, the first DOE 1108 may generate the first distribution 1102 with light points 1112. The second DOE 1110 may generate the second distribution 1104 with light points 1114. The combined distribution thus may include the light points 1112 and 1114. FIG. 11 illustrates the second distribution 1104 being a spatial shift of the first distribution 1102. However, the distributions 1102 and 1104 may include different numbers or different locations of light points other than a uniform shift of the light points between distributions. Further, while FIG. 11 illustrates the distributions 1102 and 1104 being interleaved in the combined distribution 1106, the distributions may be combined in other ways, such as being stacked, tiled, or otherwise non-interleaved.

If the overall diffractive element 1116 is configurable, a projector may be able to switch between projecting the distributions 1102-1106 for different operating modes. In one example, the projector may be configured to switch between projecting the first distribution 1102 and projecting the combined distribution 1106. In another example, if the second distribution 1104 includes a greater number of light points 1114 than the number of light points 1112 of the first distribution 1102, the projector may be able to switch between projecting the first distribution 1102, projecting the second distribution 1104, and projecting the final distribution 1106. In this manner, a projector may project fewer light points for scenes with more ambient light (such as outdoors during a sunny day) and may project more light points for scenes with less ambient light (such as indoors or night time). The projector may switch between which distributions of light are to be projected by adjusting the refractive indexes for the diffractive element 1116 in relation to the light passing through the diffractive element 1116.

In some example implementations, the refractive indexes for the diffractive element 1116 may be adjustable by adjusting the polarity of the light passing through the element 1116. For example, referring to FIG. 10, the polarity of the light passing through the element 1116 may be adjusted between a first polarity 1004, a second polarity 1006, and/or a polarity between the first polarity 1004 and the second polarity 1006. In some other example implementations, the refractive indexes for the element 1116 may be adjusted by adjusting the physical properties (and thus refractive index) of the refractive material 1118. By adjusting the physical properties of the refractive material 1118, the distribution of light may be adjusted regardless whether the light passing through the diffractive element 1116 is polarized. For example, a distribution of unpolarized light may be adjusted based on adjusting the refractive index of the refractive material 1118.

Figure 12:
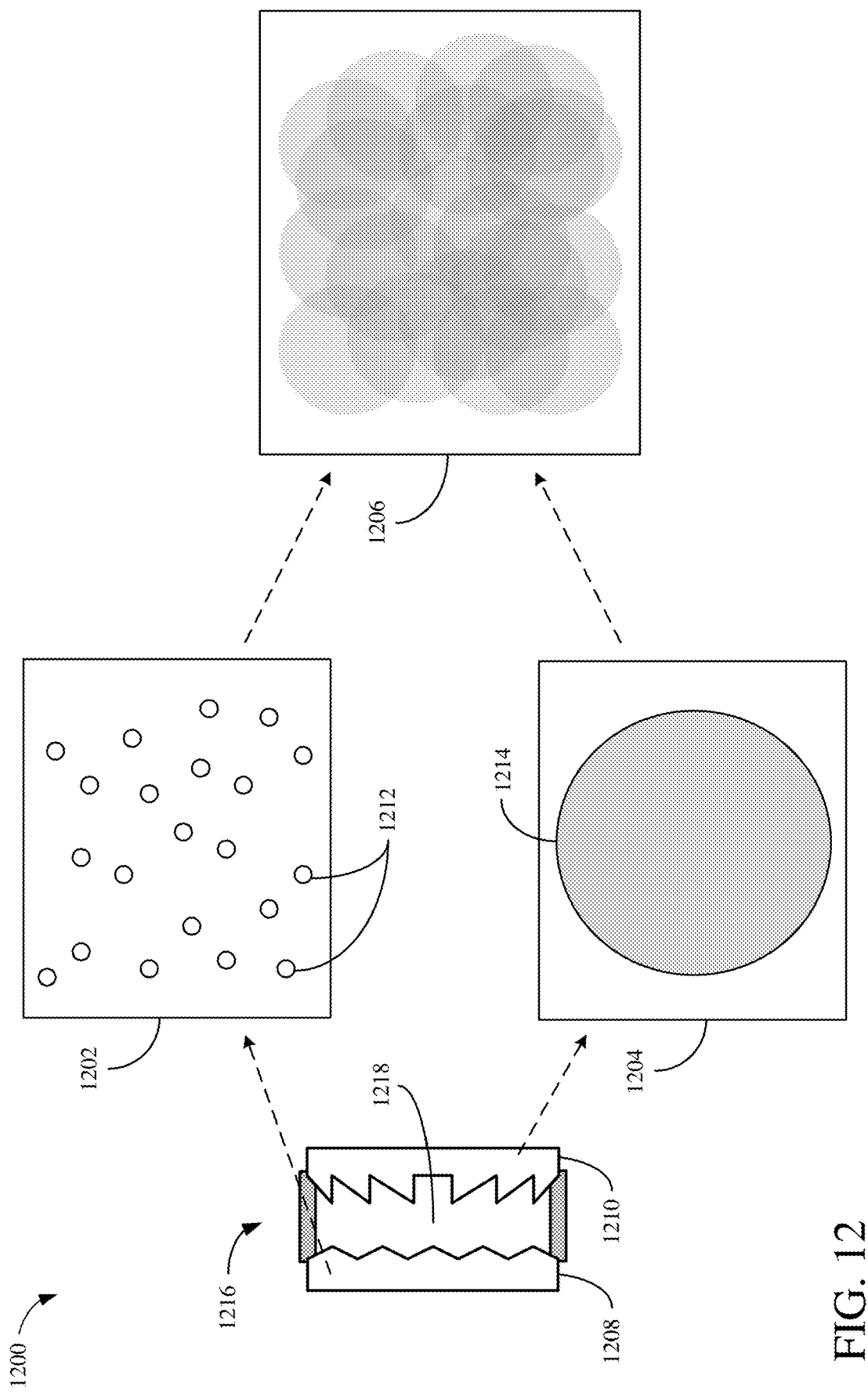
FIG. 12 is a depiction of an example distribution and an example flood illumination combined for a projector.

Combining a DOE for generating a distribution of light points and a diffusion element for flood illumination may be similar to the example in FIG. 11. FIG. 12 is a depiction 1200 of an example distribution 1202 and a flood illumination 1204 that may be projected by a configurable diffractive element 1216. The DOE 1208 may project the distribution 1202 with light points 1212. The diffusion element 1210 may project a flood illumination 1204 with a diffusion 1214. In one example, the refractive indexes for the diffractive element 1216 may be adjustable to switch between projecting the distribution 1202 and the combined projection 1206. The combined projection may include a sufficient diffusion of the light for flood illumination. In another example, the refractive indexes for the element 1216 may be adjustable to switch between projecting the distribution 1202 and the flood illumination 1204. In some example implementations, the refractive indexes of the material 1218 may be adjustable, or the polarity of the light passing through the element 1216 may be adjustable. While the example in FIG. 12 illustrates the diffusion element 1210 after the DOE 1208 (with light travelling from left to right), the ordering of the elements 1208 and 1210 may be switched. Further, while the uneven surfaces of the elements are illustrated as oriented toward each other, the surfaces may be oriented in one direction (such as in any arrangement in FIGS. 7A-7I). The present disclosure should not be limited by the specific example in FIG. 12.

Referring back to the diffractive element 1116 in FIG. 11, and similar for the element 1216 in FIG. 12, the refractive indexes of the material 1118 may be adjusted when electricity is applied to the material 1118. For example, when no electricity is applied, the material 1118 may be a birefringent material with a first refractive index for light with a first polarity 1004 and a second refractive index for light with a second polarity 1006 (FIG. 10). The first refractive index may be the refractive index of a first DOE 1108. The second refractive index may be the refractive index of the second DOE 1110. When electricity is applied to the material 1118, the refractive index may be exclusively the second refractive index for light with the second polarity. In this manner, when the light is unpolarized or having a polarity between the first polarity 1004 and the second polarity 1006, the projector may project the first distribution 1102 when electricity is applied to the material 1118, and the projector may project the combined distribution 1106 when no electricity is applied to the material 1118.

The refractive material may be coupled to one or more electrical contacts for applying electricity to the refractive material. In some examples of the element 1116 configured to apply electricity to the material 1118, the two DOEs 1108 and 1110 may be fabricated on two substrates. A layer of transparent electrode film (e.g., indium tin oxide) may be deposited on each substrate. The film thus may conduct electricity and apply the electricity to the material 1118.

An example material 1118 is a liquid crystal (LC). The LC includes a plurality of molecules with one or more orientations, and the orientation of the molecules affects the refractive index of the LC. In this manner, the refractive index of an LC may be configured by orienting the molecules of the LC. For example, if the orientation of the molecules are perpendicular to the LC (or the DOE surfaces), the refractive index of the LC may be one refractive index. The molecules may be oriented perpendicular to the LC by applying an electricity to the LC (such as via one or more electrical contacts). If no electricity is applied, the molecules may shift to different orientations. For some birefringent LCs, the molecules may be oriented in one of two orientations when no electricity is applied. In this manner, the portion of the light energy with the corresponding first polarity 1004 for the molecules in the first orientation is adjusted based on the first refractive index, and the remainder of the light energy with the corresponding second polarity 1006 for the molecules in the second orientation is adjusted based on the second refractive index. For some other birefringent LCs, the molecules may be in a first orientation when no electricity is applied and in a second orientation when electricity is applied. For some further birefringent LCs, the molecules may be randomly oriented with an average or overall refractive index of the LC as a result of the orientations of the molecules. The average refractive index may be the first refractive index or the second refractive index of the DOEs on either side of the LC. In manufacturing the diffractive element 1116 (FIG. 11) or 1216 (FIG. 12) where the refractive material is an LC, the molecules of the LC may be aligned and oriented in any suitable manner so that the refractive indexes may be adjusted based on applying an electricity to the refractive material or adjusting the polarity of the light passing through the diffractive element 1116 or 1216. If the polarity of the light is adjusted, an electricity may not be applied to the LC. In this manner, the refractive indexes of the LC changes with the change of the light polarization throughout operation of the light projector (and thus the light distribution is based on the polarity of the light passing through the elements).

In applying an electricity to the refractive material between the DOEs, the projector may be similar to the projector 200 in FIG. 2 or to the projector 300 in FIG. 3, other than the DOE 208 or 308 being replaced with a diffractive element having multiple DOEs and a refractive material (such as an LC) in between (as described above). The diffractive element may be adjusted by applying electricity to the refractive material via one or more electrical contacts (such as via an indium tin oxide layer).

Figure 13A:
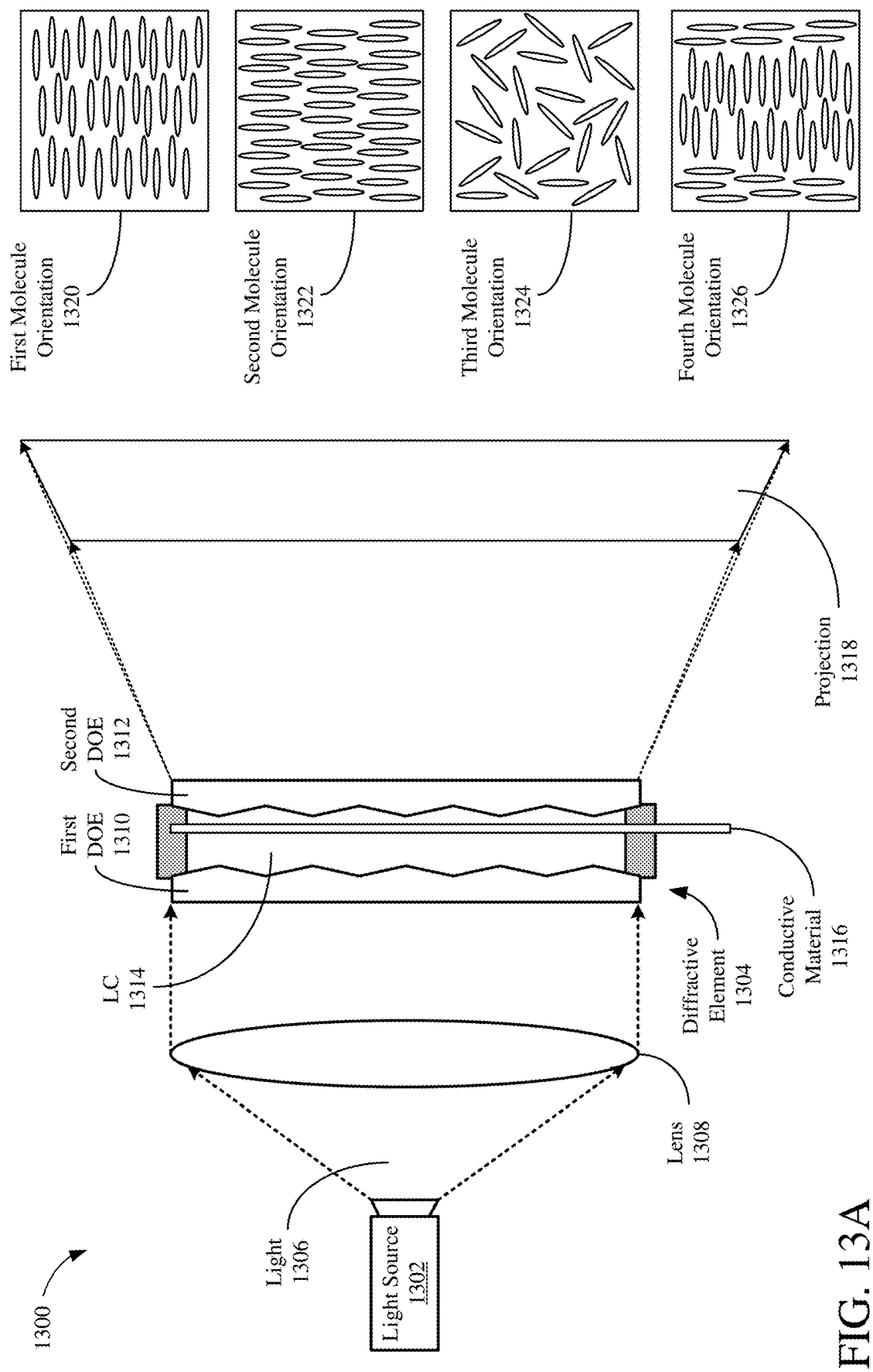
FIG. 13A is a depiction of an example projector configured to apply an electricity to the liquid crystal of the diffractive element of the projector for generating a projection.

FIG. 13A is a depiction of an example projector 1300 configured to apply an electricity to the LC 1314 (or other suitable refractive material) of the diffractive element 1304 to adjust the orientation of molecules in the LC 1314. The projector 1300 may include a light source 1302 (such as a VCSEL, DFB laser, or an array of VCSELs or DFB lasers). The light source 1302 may be configured to project light 1306 toward a lens 1308, and the lens 1308 may be configured to direct the light 1306 to the diffractive element 1304 to project the projection 1318. Example diffractive elements are as described above. In some example implementations, the diffractive element 1304 includes a first DOE 1310 at a proximal end of the diffractive element 1304 (relative to the incoming light 1306), a second DOE 1312 at a distal end of the diffractive element 1304 (relative to the incoming light 1306), and an LC 1314 between the first DOE 1310 and the second DOE 1312. The first DOE 1310 and the second DOE 1312 may be a combination of a first element to project a first distribution of light points and a second element to project a second distribution of light points. Alternatively, the first DOE 1310 and the second DOE 1312 may be a combination of a first element to project a distribution of light points and a second element to project a diffuse light. The diffractive element 1304 also may include a conductive material 1316 as one or more electrical contacts for applying electricity to the LC 1314 to adjust the orientation of the molecules in the LC 1314 (thus adjusting the distribution of light of the projection 1318).

First molecule orientation 1320 is illustrated as the molecules being perpendicular to the LC 1314 and the DOEs 1310 and 1312. The first molecule orientation 1320 may be the orientation of molecules in the LC 1314 when an electricity is applied to the LC 1314. In this manner, the refractive index of the LC 1314 may be the same as the refractive index of the first DOE 1310 (or, alternatively, the refractive index of the second DOE 1312). Light passing through the diffractive element 1304 thus may not be altered by the first DOE 1310 (or, alternatively, the second DOE 1312).

Second molecule orientation 1322 is illustrated as the molecules being parallel to the LC 1314 and the DOEs 1310 and 1312. The second molecule orientation 1322 may be the orientation of molecules in the LC 1314 when no electricity is applied to the LC 1314. In this manner, the refractive index of the LC 1314 may be the same as the refractive index of the other DOE than for the first molecule orientation

1320. Light passing through the diffractive element 1304 thus may not be altered by the other DOE than for the first molecule orientation 1320.

Third molecule orientation 1324 is illustrated as the molecules randomly oriented. The third molecule orientation 1324 is another example orientation of molecules in the LC 1314 when no electricity is applied to the LC 1314. The LC 1314 with the third molecule orientation 1324 may be configured to have an average refractive index that is different than the refractive index of the first DOE 1310 and that is different than the refractive index of the second DOE 1312 (e.g., the differences being greater than a threshold). The average refractive index for the LC 1314 with the third molecule orientation 1324 may be an average of (i) the refractive index of the LC 1314 with the first molecule orientation 1320 and (ii) the refractive index of the LC 1314 with the second molecule orientation 1322. In this manner, all of the light passing through the diffractive element 1304 experiences the same refractive index that is different from the first DOE 1310 and the second DOE 1312. As a result, all of the light passing through the diffractive element 1304 is first altered by the first DOE 1310, and then altered by the second DOE 1312.

Fourth molecule orientation 1326 is illustrated as some of the molecules oriented as in the orientation 1320 and the other molecules oriented as in the orientation 1322 when an electricity is applied to the LC 1314. The electricity may not cause some of the molecules near the surface of the LC or DOE to orient to a first molecule orientation (such as perpendicular to the LC or DOE surface). However, the molecules that remain in the second molecule orientation (such as parallel to the LC or DOE surfaces) may be a thin layer relative to the feature size of the DOE. For example, the magnitudes of the peaks and valleys of the DOE surface may be multiples of the magnitude of the layer thickness of molecules not changing their orientation. The LC 1314 may affect a small portion of the light based on the parallel orientation of some molecules, and the LC 1314 may affect the large remainder of the light based on the perpendicular orientation of the remaining molecules (such as similar to the first molecule orientation 1320).

In some examples of manufacturing the LC 1314 so that the molecules may be oriented in a specific direction (such as for orientations 1322), orientating the molecules may be difficult near the surfaces of the DOEs 1310 and 1312. For example, the molecules' orientation in the creases of the DOE surfaces may be slightly misaligned. Use of a random orientation of molecules allows for the LC 1314 to be filled in between the first DOE 1310 and the second DOE 1312 without concern for the orientation of the molecules (simplifying the manufacturing process). However, any suitable methods for manufacturing the LC 1314 may be used, and the present disclosure should not be limited to a random molecule orientation when no electricity is applied to the LC 1314 or any other described molecule orientations when no electricity is applied to the LC 1314. Further, the present disclosure should not be limited to a specific molecule orientation when an electricity is applied to the LC 1314. In some example implementations, one or both of the uneven surfaces of the DOEs 1310 and 1312 may be oriented away from the LC 1314, alleviating issues in attempting to orient the molecules along the uneven surfaces. Each of the example configurations in FIG. 9 may be applied to the diffractive element 1304 in FIG. 13A.

Applying and removing an electricity to and from the LC 1314 may configure the molecule orientation between the first molecule orientation 1320 for a first mode and one of the molecule orientations 1322-1326 for a second mode. In this manner, the projector 1300 may switch between using one of the DOEs 1310 and 1312 and using both DOEs 1310 and 1312 for the projection 1318 (such as when switching the molecule orientation between orientation 1320 and orientation 1324 or 1326), or the projector 1300 may switch between using a first DOE 1310 and using a second DOE 1312 for the projection 1318 (such as when switching the molecule orientation between orientation 1320 and orientation 1322).

FIG. 13A depicts that the conductive material 1316 may be connected to or embedded in the LC 1314 (or suitable refractive material) in coupling the conductive material 1316 to the LC 1314. In some other example implementations, the conductive material 1316 may be embedded in or connected to one or more of the DOEs in coupling the conductive material 1316 to the LC 1314 for applying electricity to the LC 1314.

Figure 13B:
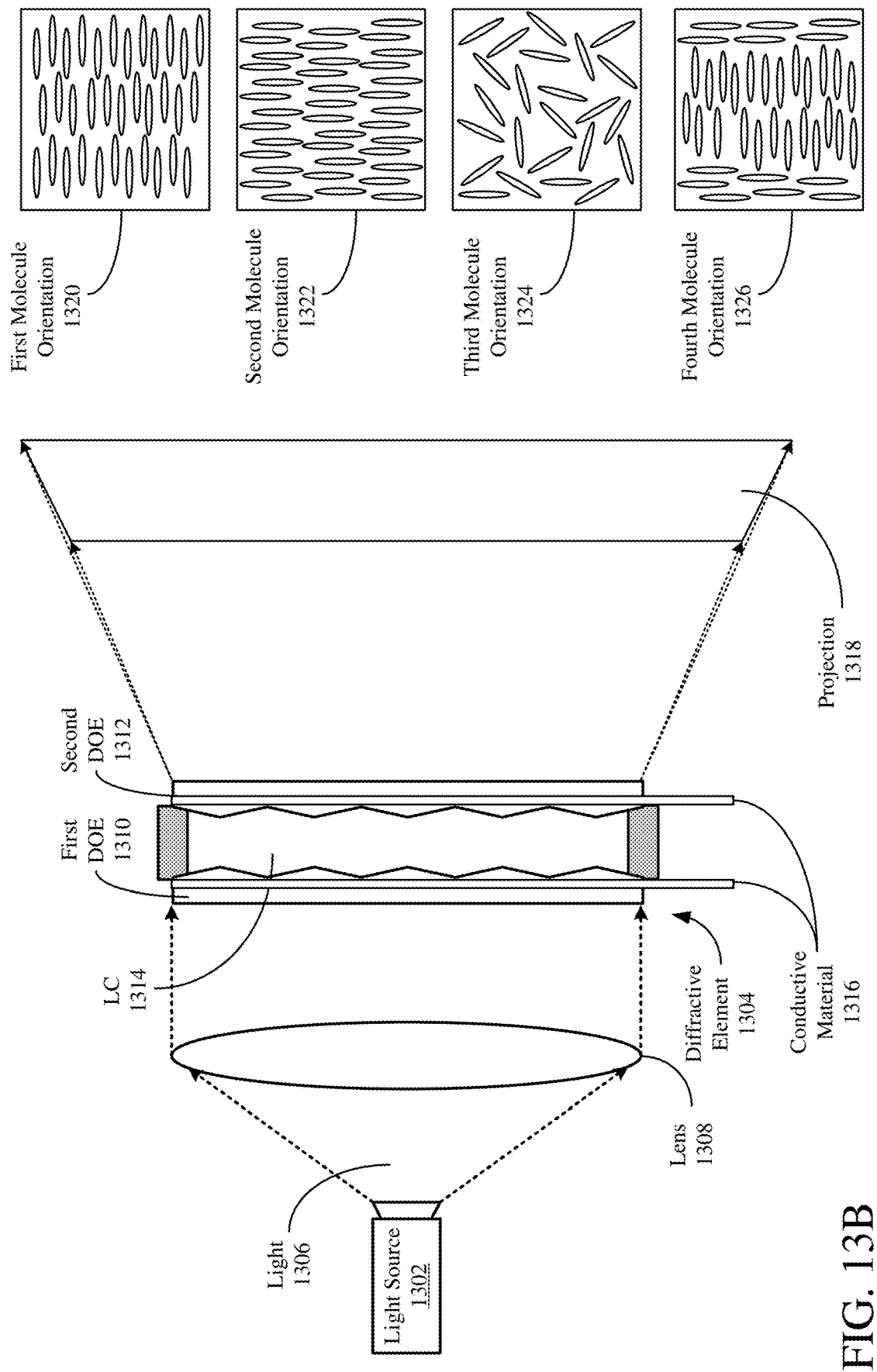
FIG. 13B is another depiction of the example projector in FIG. 13A with a different example location of the conductive material for applying electricity to the liquid crystal.

FIG. 13B is another depiction of the example projector 1300 with a different example location of the conductive material 1316 for applying electricity to the LC 1314. One or more conductive materials 1316 may be embedded in the first DOE 1310, and one or more conductive materials 1316 may be embedded in the second DOE 1312. Electricity may pass between the conductive materials 1316 embedded in the DOEs 1310 and 1312 and pass through the LC 1314.

In some example implementations, the conductive material 1316 is embedded in a DOE during DOE fabrication. For example, a DOE may be fabricated on a glass substrate. To fabricate the DOE on a glass substrate and include the conductive material, a transparent electrode film may be deposited on the glass substrate. The electrode film may be made from indium tin oxide (ITO) or any other suitable conductive material. The surface of the DOE may be fabricated by depositing a polymer layer on the electrode film and embossing or curing the polymer. In another example, the surface of the DOE may be fabricated by depositing a dielectric film on the electrode film and etching the dielectric film. In this manner, the conductive material may be embedded in the DOE and configured to apply electricity to the LC bordering the DOE surface.

Figure 13C:
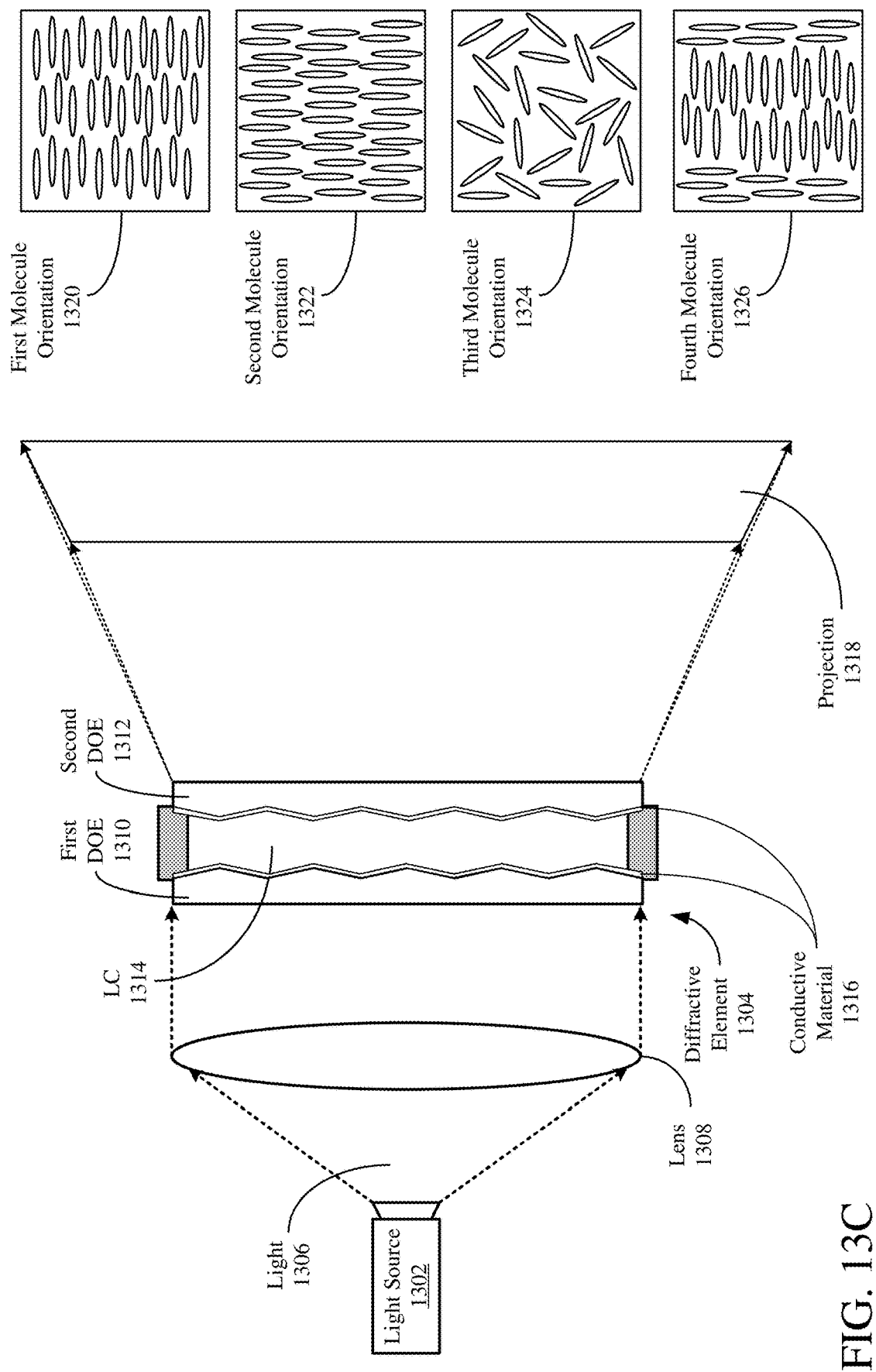
FIG. 13C is another depiction of the example projector in FIG. 13A with a different example location of the conductive material for applying electricity to the liquid crystal.

FIG. 13C is another depiction of the example projector in FIG. 13A with a different example location of the conductive material 1316 for applying electricity to the LC 1314. One or more conductive materials 1316 may be disposed on the surface of the first DOE 1310, and one or more conductive materials 1316 may be disposed on the surface of the second DOE 1312. Electricity may pass between the conductive materials 1316 disposed on the surfaces of the DOEs 1310 and 1312 to pass through the LC 1314. The conductive material 1316 may be a transparent electrode film (such as made from ITO or another suitable material) placed on the surface of the DOE during or after DOE fabrication.

While one piece of conductive material per DOE is illustrated, any number of conductive materials and any suitable type of conductive materials may be used. As such, the present disclosure should not be limited to the above examples regarding the conductive materials electrically coupled to the refractive material.

Using electricity to adjust the refractive indexes of the LC 1314 may be for unpolarized light passing through the diffractive element 1304. For example, a VCSEL or VCSEL array may emit unpolarized light, and the distribution of the light of the projection 1318 may be adjusted by applying electricity to the LC 1314 instead of polarizing the light and adjusting the polarity. Alternative to adjusting the refractive index of the LC 1314 by applying electricity, the refractive index of the LC may be adjusted by adjusting the polarity of the light passing through the diffractive element. In some example implementations, DFB lasers of a light source emit polarized light, or VCSEL(s) of a light source may be coupled to or include a polarizer so that the emitted light is polarized.

In adjusting the refractive index of the diffractive element by adjusting the polarity of the light passing through the element, a projector may transmit linearly polarized light through the element, and a polarization rotator may be used to rotate the linear polarization of the light. For example, a half-wave plate may be rotated between 0 and 90 degrees to adjust the polarization of the polarized light between a first polarization 1004 and a second polarization 1006 (as illustrated in FIG. 10).

Figure 14:
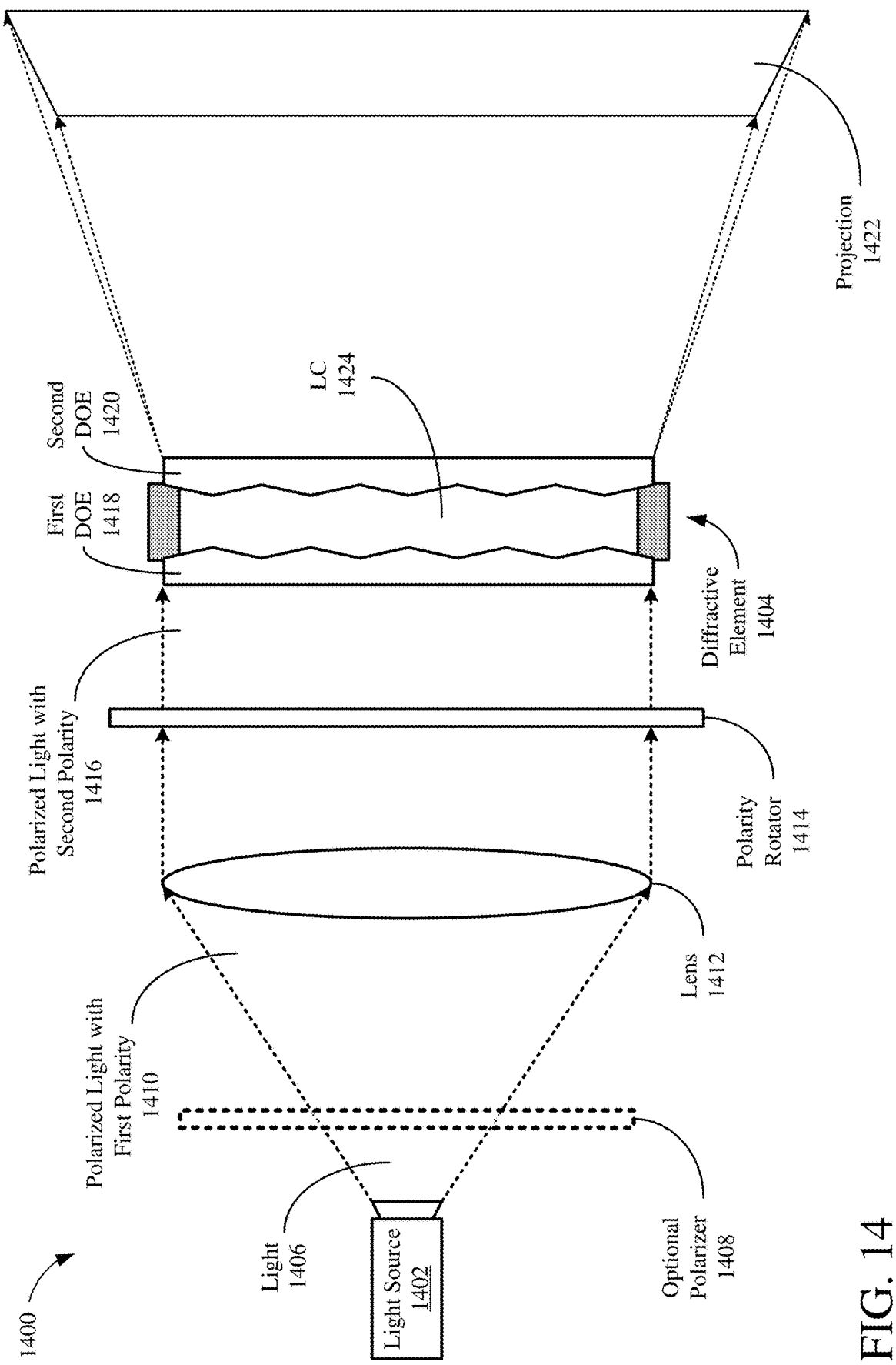
FIG. 14 is a depiction of an example projector configured to adjust the polarity of the light passing through a diffractive element of the projector for generating a projection.

FIG. 14 is a depiction of an example projector 1400 configured to adjust the polarity of the light passing through a diffractive element 1404 to adjust the distribution of light of the projection 1422. For example, the projector 1400 may adjust the light distribution of the projection 1422 from a first distribution of light points to a second distribution of light points (and/or a third distribution of light points), or the projector 1400 may adjust the projection 1422 from a distribution of light points for active light depth sensing to a diffuse light for flood illumination.

The projector 1400 may include a light source 1402. Some example implementations of the light source 1402 are a single laser (such as a VCSEL of DFB laser) or an array of lasers (such as a VCSEL array or a DFB laser array). The light source 1402 may be configured to emit light 1406 toward the lens 1412. If the light 1406 is unpolarized (such as provided by a VCSEL or VCSEL array), the projector 1400 optionally may include a polarizer 1408 to filter the light 1406 to polarized light 1410 with a first polarity. The polarity may be a linear polarity. In the example, the first polarity is described as the first polarity 1004 (FIG. 10) for ease of explanation, but any suitable polarity may be used.

The lens 1412 may be configured to direct the polarized light 1410 toward the diffractive element 1404. The diffractive element 1404 may be similar to the diffractive element 1304 in FIGS. 13A-13C, other than an electricity may not be applied to the LC 1424 in adjusting the orientation of the molecules in the LC 1424. For example, the diffractive element 1404 may not include the conductive material (such as transparent conductive electrodes embedded in the DOEs). In some example implementations, the orientation of the molecules is the second molecule orientation 1322 (FIG. 13).

The projector 1400 further may include a polarity rotator 1414 for rotating the polarity of the polarized light 1410. For example, the polarity rotator 1414 may be a filter configured to rotate the polarity of the polarized light 1410 anywhere from the first polarity 1004 to the second polarity 1006. In some example implementations, the polarity rotator 1414 is a half-wave plate. The half-wave plate may be an LC waveplate configured for adjusting the polarity of the light by rotating between 0 degrees (such as for the first polarity 1004) and 45 degrees (such as for the second polarity 1006 90 degrees to the first polarity 1004). However, any suitable component for rotating or adjusting the polarity of the light 1410 may be used.

For the diffractive element 1404, the first DOE 1418 may have a first refractive index, and the second DOE 1420 may have a second refractive index. The LC 1424 may be birefringent with the first refractive index (of the first DOE 1418) for light with a first polarity 1004 and the second refractive index (of the second DOE 1420) for light with a second polarity 1006. In this manner, the projection 1422 may be adjusted based on the polarity of the polarized light 1416. Any of the orientations of the DOEs in FIGS. 9A-9F, or any other suitable orientation of the DOEs, may be applied to the diffractive element 1404 in FIG. 14.

Figure 15:
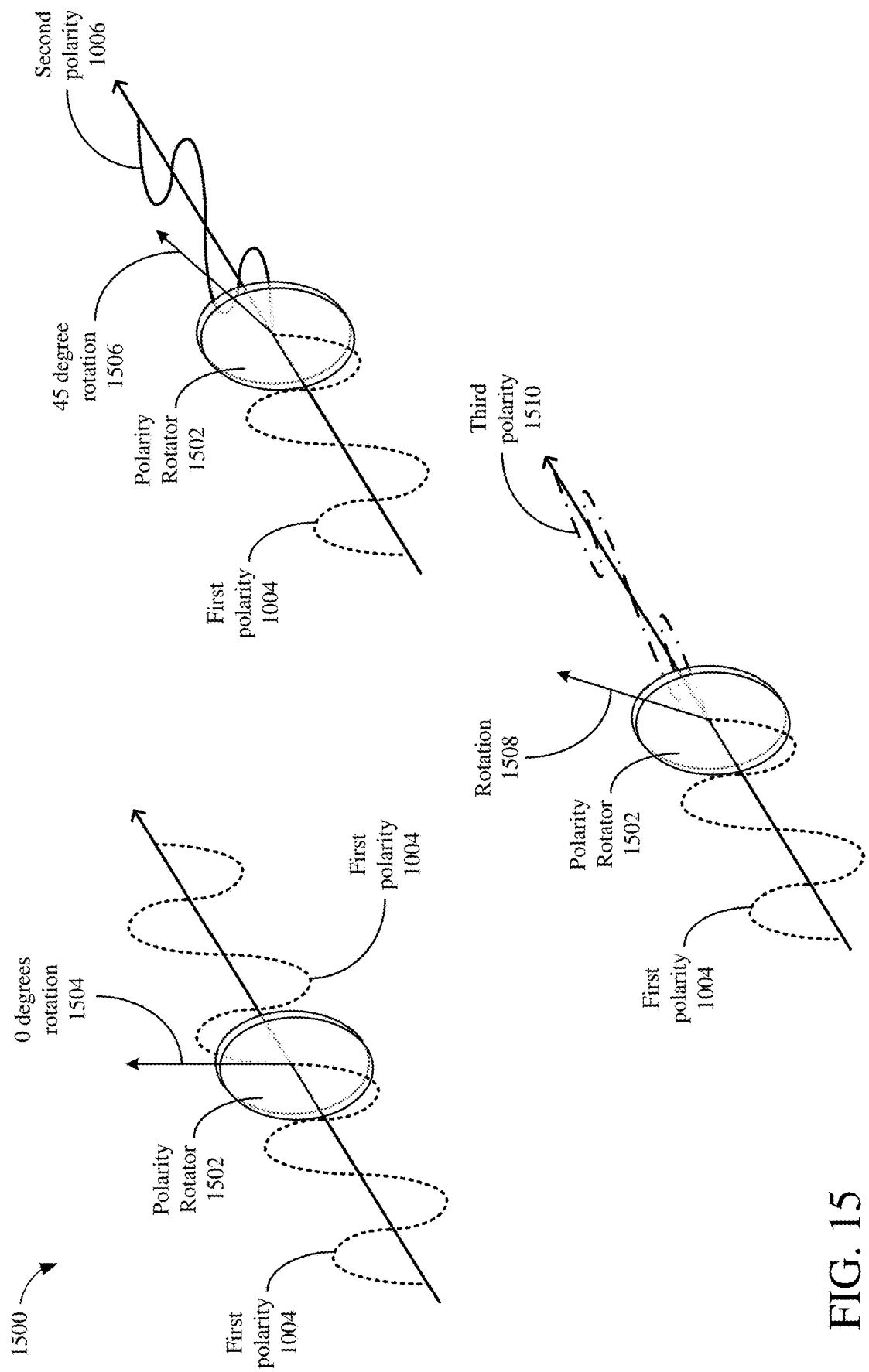
FIG. 15 is a depiction of example adjustments to the polarity of the light by adjusting the polarity rotator.

FIG. 15 is a depiction 1500 of example adjustments to the polarity of the light by adjusting the orientation of the polarity rotator 1502. The examples illustrate a half-wave plate as the polarity rotator 1502 in adjusting the polarity, but any suitable component may be used. In some examples, light with a first polarity 1004 (as illustrated in FIG. 10) may remain at a first polarity 1004 when the polarity rotator 1502 has a 0 degree rotation 1504. Light with a first polarity 1004 may be changed to a second polarity 1006 when the polarity rotator 1502 has a 45 degree rotation 1506. Light with a first polarity 1004 may be changed to a third polarity 1510 (between the first polarity 1004 and the second polarity 1006) when the polarity rotator 1502 has a rotation 1508 between 0 degrees and 45 degrees. Light with a third polarity 1510 thus may have a first component with a first polarity 1004 and a second component with a second polarity 1006.

Figure 16A:
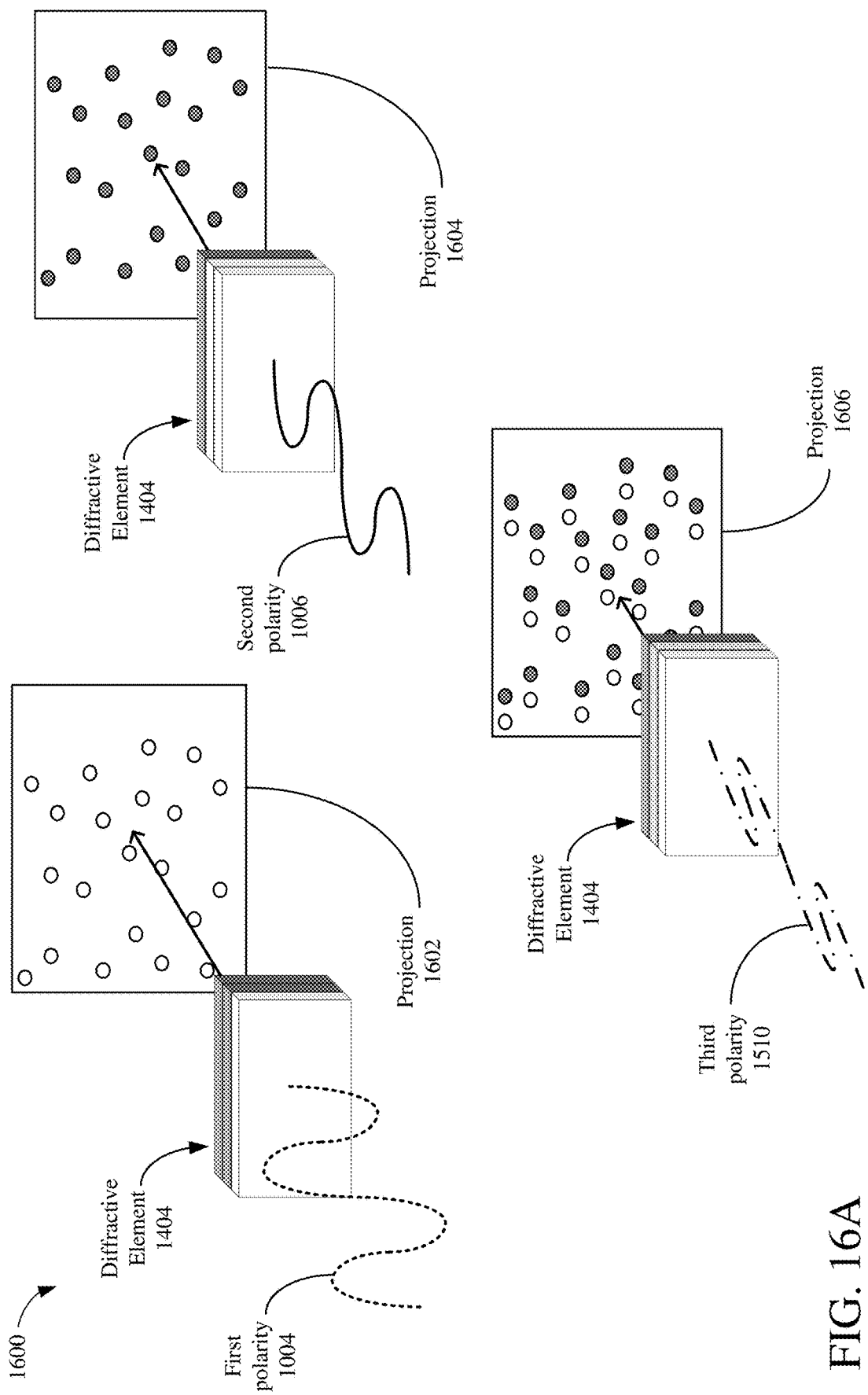
FIG. 16A is a depiction of example projections based on the polarity of light passing through the diffractive element.

FIG. 16A is a depiction 1600 of the projections based on the polarity of light passing through the diffractive element 1404. For light having a first polarity 1004, the first DOE of the diffractive element 1404 may divide the light into the projection 1602 (with the second DOE having no impact on the distribution of light). For light having a second polarity 1006, the second DOE of the diffractive element 1404 may divide the light into the projection 1604. The projection 1604 may have more or less light points than the projection 1602. In this manner, the projector 1400 (FIG. 14) may adjust the density of the distribution of light points by rotating the polarity of the light by 90 degrees.

For light having a third polarity 1510 between the first polarity 1004 and the second polarity 1006, each DOE of the diffractive element 1404 may divide a portion of the light into the projection 1602 and the projection 1604 combined to generate the projection 1606 (based on the refractive indexes of the LC 1424). If the projection 1604 includes more or less light points than the projection 1602, the angle of the third polarity 1510 may be based on the number of light points of the projection 1604 relative to the number of light points of the projection 1602 so that each light point in the projection 1606 has the same energy. For example, if the projection 1604 includes twice as many light points as the projection 1602, the energy is dispersed twice as much for the projection 1604 than the projection 1602. As a result, the third polarity 1510 may be at 54.7 degrees relative to the first polarity 1004 at 0 degrees so that twice as much energy is to be dispersed for the projection 1604 than for the projection 1602. If the projection 1604 has the same number of light points as the projection 1602, the light energy may be divided equally between the first polarity 1004 and the second polarity 1006, and the third polarity 1510 may be at 45 degrees relative to the first polarity 1004 at 0 degrees. While FIG. 16A is depicted regarding adjusting the density of a distribution of light points, the same may apply for switching between a distribution of light points for active light depth sensing and a diffuse light for flood illumination.

Figure 16B:
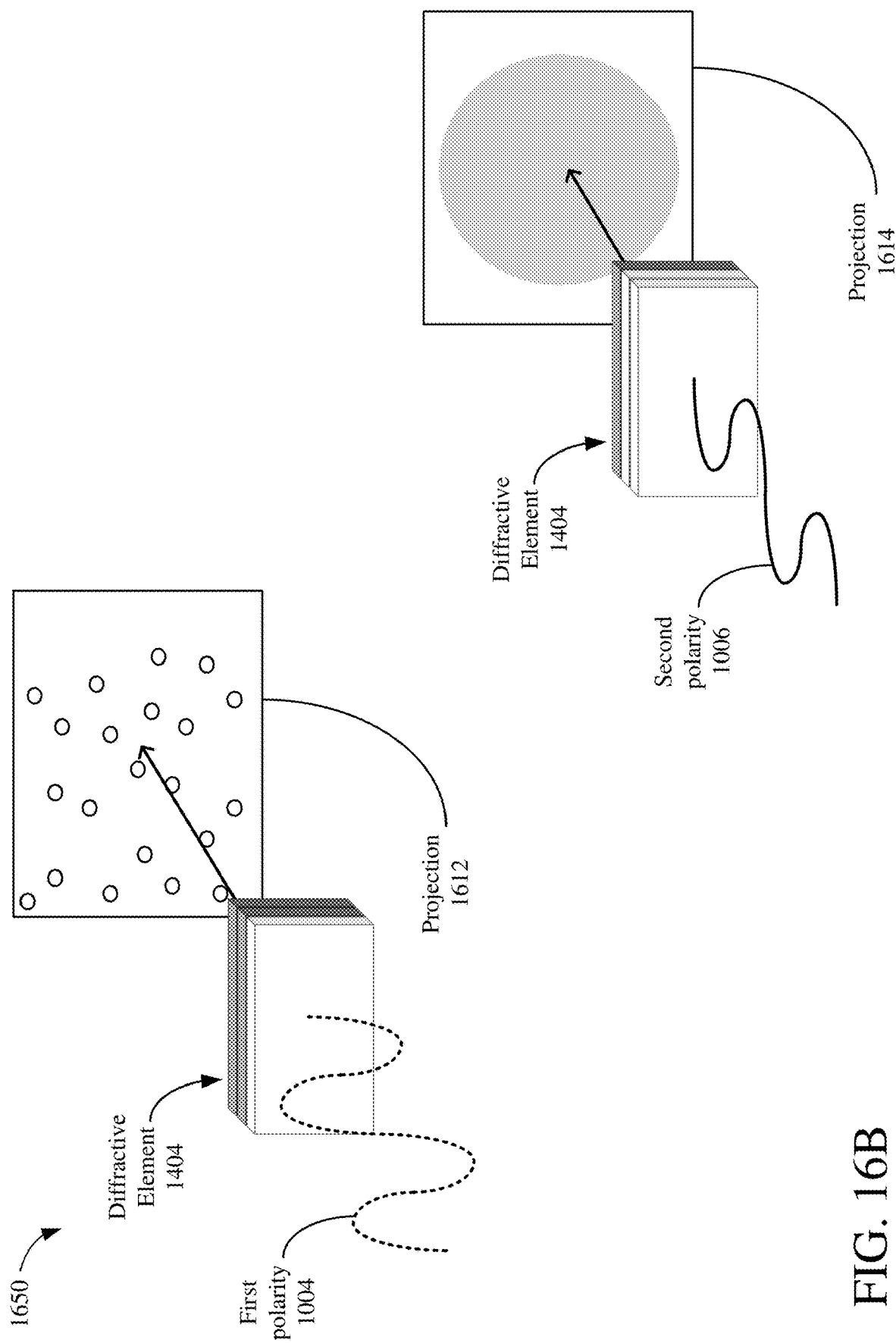
FIG. 16B is a depiction of further example projections based on the polarity of light passing through the diffractive element.

FIG. 16B is a depiction 1650 of projections including a distribution of light points or flood illumination based on the polarity of light passing through the diffractive element 1404. For light having a first polarity 1004, the first DOE of the diffractive element 1404 may divide the light into the projection 1612 (with the second DOE (diffusion element) having no impact). For light having a second polarity 1006, the second DOE (diffusion element) of the diffractive element 1404 may diffuse the light for flood illumination, such as illustrated by the projection 1614. In this manner, the projector 1400 (FIG. 14) may switch between projecting a distribution of light points and flood illumination by rotating the polarity of the light 90 degrees.

With a projector configured to adjust its projection (such as adjusting the density of the distribution of light points or switching between projecting a distribution of light points and flood illumination), a device including the projector may be configured to control operation of the projector. For example, the device 600 (FIG. 6) may be configured to control operation of the transmitter 601, including adjusting the distribution of light from the transmitter 601. The distribution of light may be adjusted by adjusting the refractive indexes of a diffractive element in the transmitter 601 (such as through applying an electricity to a birefringent refractive material, such as an LC, or through adjusting the polarity of the light passing through the diffractive element).

Figure 17:
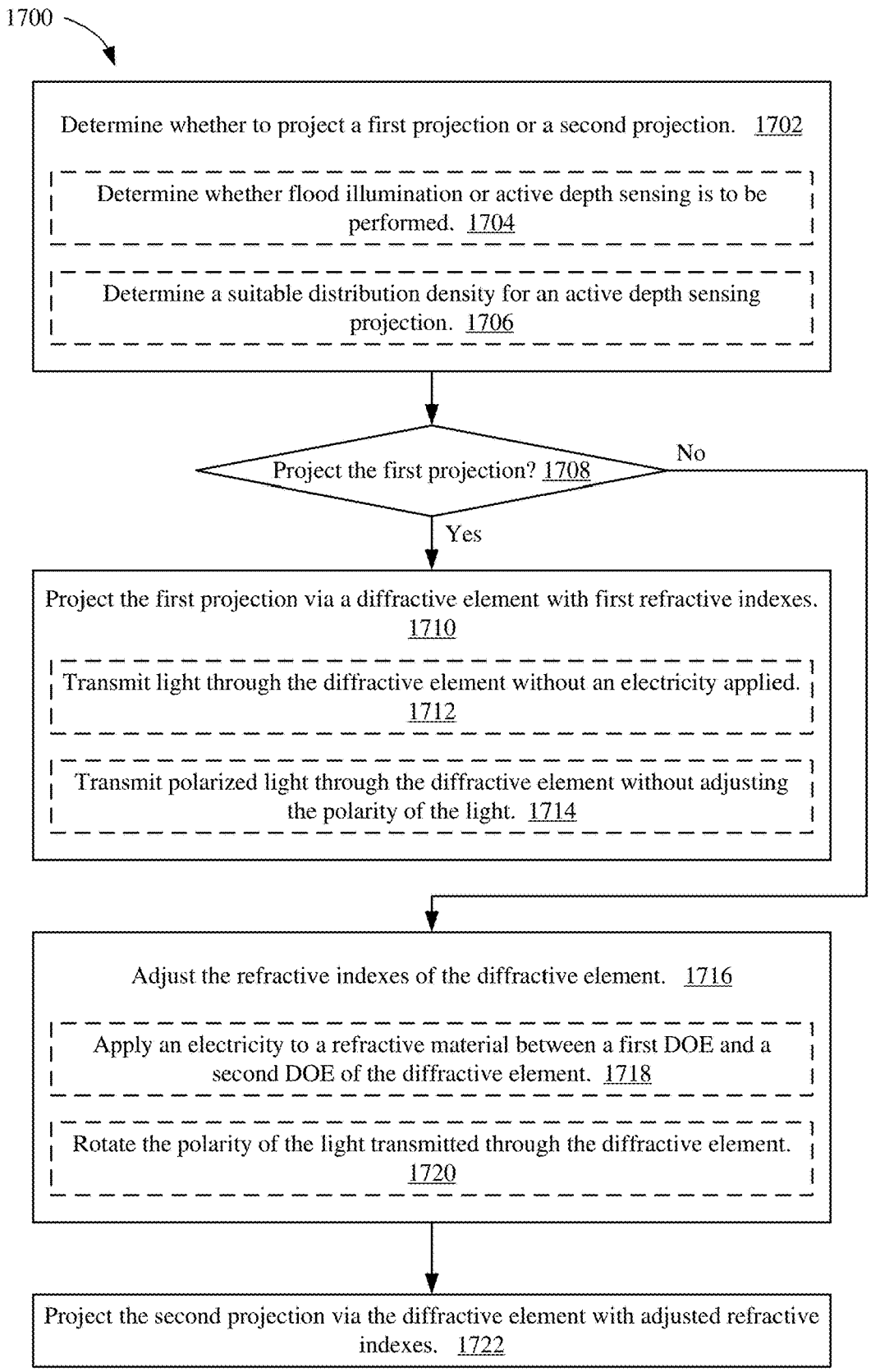
FIG. 17 is an illustrative flow chart depicting an example operation for adjusting the distribution of light to be projected by a projector.

FIG. 17 is an illustrative flow chart depicting an example operation 1700 for adjusting the distribution of light to be projected by a projector. The device 600 in FIG. 6 is referred to in performing the example operation 1700 for ease of explanation, but any suitable device may perform the example operation 1700. Further, operations for controlling the transmitter 601 may be performed by the light controller 610 (such as the signal processor 612), the processor 604, and/or any other suitable component of the device 600.

Beginning at 1702, the device 600 may determine whether the transmitter 601 is to project a first projection or a second projection. In some aspects, the first projection may be a first distribution of light for active depth sensing, and the second projections may be a diffuse light for flood illumination. In some other aspects, the first projection may be a first distribution of light, and the second projection may be a second distribution of light different from the first distribution. Other suitable combinations of projections may exist, and the present disclosure should not be limited to the provided examples.

In some example implementations, the determination of which projection is to be projected may be based on whether flood illumination or active depth sensing is to be performed by the device 600 (1704). In some other example implementations where active depth sensing is to be performed, the device 600 may determine a suitable distribution density of light (1706) where the first projection and the second projection include different density distributions (e.g., as illustrated in FIG. 11). The determination may be based on the amount of ambient light existing in the scene. Additionally or alternatively, the determination may be based on the resolution needed, the application for which active depth sensing is to be performed, or the distance of the object from the device 600 for which active depth sensing is being performed. For example, facial recognition applications may require a higher resolution (and thus a higher density of light distribution by the transmitter 601) than object tracking or range finding applications.

While not illustrated, the device 600 may determine whether a third projection is to be projected. For example, the device 600 may determine whether the transmitter 601 should project the first projection and the second projection as a combined projection (such as to increase the density of a distribution by projecting a first density distribution and a second density distribution).

If the transmitter 601 is to project the first projection (1708), the transmitter 601 may project the first projection via a diffractive element with first refractive indexes (1710). The diffractive element may include two DOEs with a refractive material (such as a LC) in between, as described in the above examples. In some example implementations of the diffractive element having first refractive indexes, the transmitter 601 may transmit light through the diffractive element without applying an electricity to the refractive material between the DOEs (1712). In some other example implementations, the transmitter 601 may transmit polarized light through the diffractive element without adjusting the polarity of the light (1714). For example, the polarity of the light may remain in a first polarity 1004 when passing through a half-wave plate as a result of the half-wave plate of the projector remaining at a rotation of 0 degrees.

Referring back to 1708, if the transmitter 601 is to project the second projection, the device 600 may adjust the refractive indexes of the diffractive element (1716). In some example implementations, the device 600 may apply an electricity to the refractive material between the first DOE and the second DOE of the diffractive element (1718). For example, an electricity may be applied to an LC to adjust the orientation of the molecules in the LC. In some other example implementations, the device 600 may rotate the polarity of polarized light transmitted through the diffractive element (1720). For example, the device 600 may adjust a polarity rotator (such as rotating a half-wave plate) to rotate the polarity of the light from 0 degrees to up to 90 degrees.

The transmitter 601 then may project the second projection via the diffractive element with the adjusted refractive indexes (1722). While the example operation 1700 describes projection of a first projection or a second projection, any number of projections may be projected (such as a third projection). The plurality of projections may be for flood illumination or active depth sensing, based on the DOEs of the diffractive element in the transmitter 601.

Figure 18:
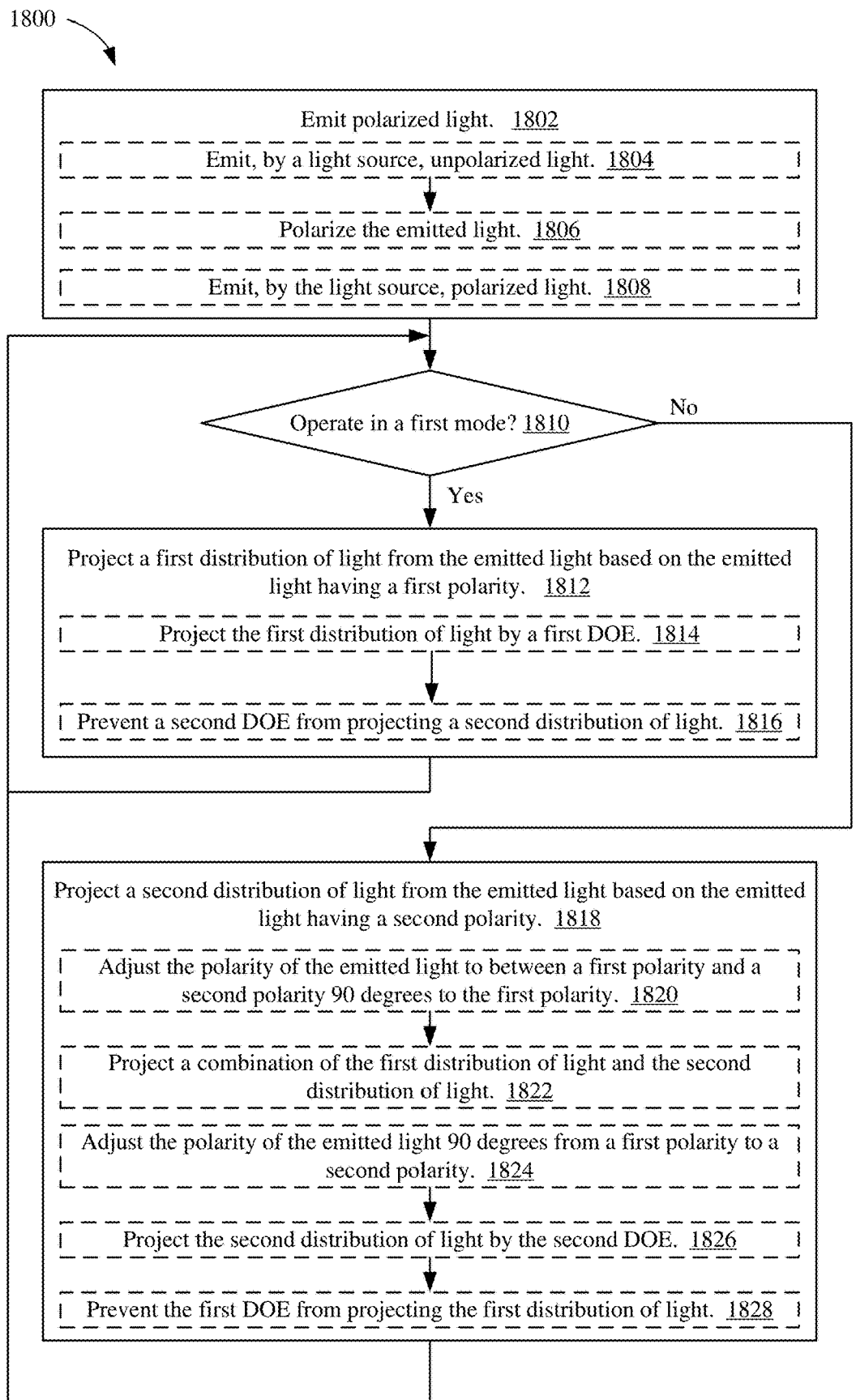
FIG. 18 is an illustrative flow chart depicting an example operation for adjusting the distribution of light by a light projector.

For active depth sensing, and specifically referring to a light projector whose projected distribution of light is adjustable based on the polarity of the light, a device (such as device 600 in FIG. 6) may control the transmitter 601 to adjust the polarity of the light from the transmitter 601. FIG. 18 is an illustrative flow chart depicting an example operation 1800 for adjusting the light projection from a light projector. The device 600 in FIG. 6 is referred to in performing the example operation 1800 for ease of explanation, but any suitable device may perform the example operation 1800. Further, operations for controlling the transmitter 601 may be performed by the light controller 610 (such as the signal processor 612), the processor 604, and/or any other suitable component of the device 600. Additionally, the transmitter 601 is described as including a diffractive element, such as described above. However, any suitable diffractive element may be used in performing the steps of the example operation 1800.

Beginning at 1802, the transmitter 601 may emit polarized light. In some example implementations, a light source of the transmitter 601 may emit unpolarized light (1804). For example, the light source may be one or more VCSELs that emit unpolarized light. The transmitter then may polarize the emitted light (1806). For example, a polarizer may receive the unpolarized light from the one or more VCSELs, and polarize the emitted light to have a first polarity. In some other example implementations, the light source of the transmitter 601 may emit polarized light (1808). For example, the light source may be one or more DFB lasers to emit light having a first polarity. In this manner, a polarizer may not be needed to polarize the light from the light source.

Proceeding to 1810, the device 600 may determine whether the transmitter 601 is to operate in a first mode. In some example implementations, the transmitter 601 may switch between a first mode and a second mode associated with projecting different distributions of light. In some other example implementations, the transmitter 601 may switch between the first mode, the second mode, and a third mode associated with projecting different distributions of light. While the examples describe switching between two or three modes, the transmitter 601 may be configured to switch between any number of modes and project any number of light distributions, and the present disclosure should not be limited to the examples.

The first mode may be associated with a first distribution of light, and the second mode may be associated with a second distribution of light. In some example implementations, the distributions of light may be distributions of light points, and the first distribution of light may have a fewer number of light points (sparser density of light points) than the second distribution of light. In this manner, each light point in the first distribution may have a greater intensity than each light point in the second distribution. Since a fewer number of light points may exist for the first distribution (when the transmitter 601 is operating in the first mode) than for the second distribution (when the transmitter 601 is operating in the second mode), and the intensity of each light point may be greater in the first distribution than in the second distribution, the device 600 may determine to operate the transmitter 601 in the first mode, e.g., for performing active depth sensing when a greater level of interference exists in the scene or for determining depths of objects further from the device 600 than for the second mode.

In an example of determining whether to operate the transmitter 601 in the first mode or in the second mode, the determination may be based on the amount of ambient light or other interference in the scene. For example, the device 600 may capture an image or measure the ambient light in a scene using the receiver 602. If the ambient light is greater than a threshold, the device 600 may determine to operate the transmitter 601 in the first mode for active depth sensing. If the ambient light is less than the threshold, the device 600 may determine to operate the transmitter 601 in the second mode for active depth sensing.

In another example, the determination as to which mode to operate the transmitter 601 may be based on an application being executed by the device 600. For example, if the device 600 is performing facial recognition, a greater number of light points for the light distribution may be beneficial, and the device 600 may determine to operate the transmitter 601 in the second mode. In one example, facial recognition may be used for payment approval by or unlocking of mobile payment applications. Such applications are typically executed indoors with less interference from ambient light than outdoors. As a result, the interference may not be substantial enough for a greater number of light points with each point having less intensity to cause problems for the facial recognition. If the device 600 is performing facial recognition to open the phone outdoors (which may have more interference from ambient light than indoors), or range finding of objects greater than a threshold distance from the device 600, stronger intensity light points may be beneficial, and the device 600 may determine to operate the transmitter 601 in the first mode.

In some example implementations where the transmitter 601 may operate in a third mode associated with a third distribution of light, the third distribution of light may have more points of light than the first distribution of light and the second distribution of light. For example, the third distribution of light may be a combination of the first distribution of light and the second distribution of light. In some examples, the third distribution of light may have a number of light points equal to the summation of the number of light points of the first distribution of light and of the second distribution of light. In this manner, the intensity of each light point in the third distribution of light may be less than the intensity of each light point in the first distribution of light and in the second distribution of light. The device 600 may determine in which mode to operate the transmitter 601 based on, e.g., the resolution required by an application and/or the amount of ambient light or other interference existing in the scene. For example, the device 600 may determine to operate the transmitter 601 in the third mode if the ambient light or interference is below a threshold in order to have a higher resolution for active depth sensing than if operating in the first mode or the second mode.

Referring back to 1810, if the device 600 determines that the transmitter 601 is to operate in the first mode, a diffractive element of the transmitter 601 may project a first distribution of light from the emitted light based on the emitted light having a first polarity (1812). The diffractive element may include a first DOE and a second DOE (such as described above or illustrated in FIG. 14). In some example implementations of the transmitter 601 operating in the first mode, the first DOE may project the first distribution of light (1814), and the second DOE may be prevented from projecting the second distribution of light (1816) based on the emitted light having a first polarity. Referring back to 1810, if the device 600 determines that the transmitter 601 is not to operate in the first mode (such as to operate in a second mode), the diffractive element of the transmitter 601 may project a second distribution of light from the emitted light based on the emitted light having a second polarity (1818).

In some example implementations, the first DOE has a first refractive index associated with a first polarity, the second DOE has a second refractive index associated with a second polarity, and the diffractive element also includes a birefringent material between the first DOE and the second DOE having the first refractive index and the second refractive index. In this manner, if the polarity of the emitted light is adjusted to and from the first polarity, the device 600 may adjust preventing and enabling the second DOE from projecting the second distribution of light. If the second polarity is 90 degrees relative to the first polarity, and the polarity of the emitted light is adjusted to and from the second polarity, the device 600 may adjust preventing and enabling the first DOE from projecting the first distribution of light.

In some example implementations, a second mode may be associated with the polarity of the emitted light being between the first polarity and the second polarity. In this manner, the distribution of light from the diffractive element may be a combination of the first distribution of light (projected by the first DOE) and the second distribution of light (projected by the second DOE). In some examples, the transmitter 601 may adjust (such as rotate) the polarity of the emitted light between the first polarity and the second polarity (1820). For example, a polarity rotator (such as a half-wave plate) may be rotated less than 45 degrees to adjust the polarity of the emitted light to between the first polarity and the second polarity. The diffractive element of the transmitter 601 then may project a combination of the first distribution of light and the second distribution of light (1822) based on the adjusted polarity of the emitted light.

In some other example implementations, a second mode may be associated with the polarity of the emitted light being the second polarity (90 degrees relative to the first polarity). In this manner, the distribution of light from the diffractive element may be the second distribution of light (projected by the second DOE), and the first DOE may be prevented from projecting the first distribution of light. In some examples, the transmitter 601 may adjust (such as rotate) the polarity of the emitted light 90 degrees from the first polarity to the second polarity (1824). For example, a polarity rotator (such as a half-wave plate) may be rotated 45 degrees to adjust the polarity of the emitted light. The second DOE of the diffractive element of the transmitter 601 then may project the second distribution of light (1826), and the first DOE may be prevented from projecting the first distribution of light based on the adjusted polarity of the emitted light (1828).

While not shown, if the second mode is associated with the second polarity for the emitted light 90 degrees relative to the first polarity, a third mode may exist for the transmitter 601 and be associated with a third polarity for the emitted light between the first polarity and the second polarity. In this manner, the transmitter 601 may project a combination of the first distribution of light and the second distribution of light when operating in the third mode (similar to steps 1820 and 1822 described above).

Referring back to steps 1812 and 1818, the example operation may revert to decision 1810. In this manner, the device 600 periodically may determine whether to switch operating modes for the transmitter 601 (such as between a first mode and a second mode, and optionally, a third mode). In one example, the device 600 may determine if the amount of ambient light increases above or decreases below the threshold in determining when to switch between operating modes. In another example, the device 600 may determine a change in application being executed, a change in use case for active depth sensing, or other suitable criteria for switching modes of the transmitter 601. In response to determining that the transmitter 601 is to switch operating modes, the device 600 may instruct the transmitter 601 to adjust the polarity of the emitted light passing through the diffractive element (such as by rotating a half-wave plate to rotate the polarity of the emitted light). In this manner, a single light projector may be adjusted for projecting different distributions of light for active depth sensing.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 606 in the example device 600 of FIG. 6) comprising instructions 608 that, when executed by the processor 604 (or the controller 610 or the signal processor 612), cause the device 600 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 604 or the signal processor 612 in the example device 600 of FIG. 6. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the projectors are illustrated as including a lens to direct light toward a diffractive element, a projector may not include a lens or may include multiple lenses. In another example, while two elements of a diffractive element are described (such as two DOEs for different light distributions), any number of DOEs and/or diffusion elements may exist in the diffractive element, and multiple refractive materials may exist in the diffractive element. In another example, the electricity applied by the device or light projector in adjusting the projection may be alternating current (AC) or direct current (DC), and the voltage may be constant or non-constant. The electricity therefore may be any suitable electricity for adjusting the projection. Additionally, the functions, steps or actions of the method claims in accordance with aspects described herein need not be performed in any particular order unless expressly stated otherwise. For example, the steps of the described example operations, if performed by the device 600, the controller 610, the processor 604, and/or the signal processor 612, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device comprising a light projector, the light projector comprising:
 a light source configured to emit a light that is polarized;
 a polarity rotator configured to set a polarity of the emitted light to a first polarity when the light projector is in a first mode and to set the polarity of the emitted light to a second polarity when the light projector is in a second mode; and a diffractive element configured to:
receive the emitted light;
project a first distribution of light when the received light has the first polarity, the first distribution of light having a first density of projected light points; and
project a second distribution of light when the received light has the second polarity, the second distribution of light having a second density of projected light points that is different than the first density of projected light points.

2. The device of claim 1, wherein the diffractive element comprises:
a first diffractive optical element configured to project the first distribution of light in the first mode; and
a second diffractive optical element configured to project the second distribution of light in the second mode.

3. The device of claim 2, wherein the diffractive element further comprises a birefringent material between the first diffractive optical element and the second diffractive optical element, wherein:
the first diffractive optical element has a first refractive index;
the second diffractive optical element has a second refractive index; and
the birefringent material has the first refractive index and the second refractive index.

4. The device of claim 3, wherein the diffractive element is further configured to project a combination of the first distribution of light projected by the first diffractive optical element and the second distribution of light projected by the second diffractive optical element during the second mode.

5. The device of claim 4, wherein the polarity rotator is configured to rotate 45 degrees in switching the light projector between the first mode and the second mode.

6. The device of claim 3, wherein the diffractive element is further configured to prevent the first diffractive optical element from projecting the first distribution of light during the second mode.

7. The device of claim 6, wherein the polarity rotator is configured to rotate 90 degrees in switching the light projector between the first mode and the second mode.

8. The device of claim 7, wherein:
the diffractive element is further configured to project a third distribution of light when the received light has a third polarity that is offset relative to the first polarity and the second polarity for the light projector operating in a third mode, wherein the third distribution of light is a combination of the first distribution of light projected by the first diffractive optical element and the second distribution of light projected by the second diffractive optical element; and
the polarity rotator is further configured to rotate in switching the light projector between the first mode and the third mode or between the second mode and the third mode.

9. The device of claim 3, wherein the light projector further comprises a polarizer located between the light source and the diffractive element, wherein:
the light source includes one or more vertical cavity surface-emitting lasers configured to emit unpolarized light; and
the polarizer is configured to polarize the emitted light with the first polarity.

10. The device of claim 3, wherein the light source includes one or more distributed feedback lasers configured to emit polarized light having the first polarity.

11. The device of claim 1, wherein the light source is configured to emit infrared light, the device further comprising an infrared receiver configured to receive reflections of the infrared light.

12. The device of claim 11, further comprising one or more processors configured to:
determine one or more depths in a scene from the received reflections by the infrared receiver; and
control operation of the light projector.

13. The device of claim 12, further comprising a color image sensor configured to receive visible light from the scene during the device capturing an image of the scene.

14. The device of claim 12, wherein the device is a wireless communication device further comprising one or more transceivers configured for wireless communications.

15. A method for active depth sensing, comprising:
emitting light by a light source, the emitted light being polarized;
setting a polarity of the emitted light to a first polarity when the light source is in a first mode for light projection and setting the polarity of the emitted light to a second polarity when the light source is in a second mode for light projection;
receiving, by a diffractive element, the emitted light;
projecting, by the diffractive element, a first distribution of light when the received light has the first polarity, the first distribution of light having a first density of projected light points; and
projecting, by the diffractive element, a second distribution of light when the received light has the second polarity, the second distribution of light having a second density of projected light points that is different than the first density of projected light points.

16. The method of claim 15, wherein:
the first distribution of light is projected by a first diffractive optical element of the diffractive element during the first mode; and
the second distribution of light is projected by a second diffractive optical element of the diffractive element during the second mode.

17. The method of claim 16, further comprising switching between the first mode and the second mode, wherein the diffractive element further comprises a birefringent material between the first diffractive optical element and the second diffractive optical element, wherein:
the first diffractive optical element has a first refractive index;
the second diffractive optical element has a second refractive index; and
the birefringent material has the first refractive index and the second refractive index.

18. The method of claim 17, further comprising projecting a combination of the first distribution of light projected by the first diffractive optical element and the second distribution of light projected by the second diffractive optical element during the second mode.

19. The method of claim 18, wherein switching between the first mode and the second mode comprises rotating a polarity rotator 45 degrees.

20. The method of claim 17, further comprising preventing the first diffractive optical element from projecting the first distribution of light during the second mode.

21. The method of claim 20, wherein switching between the first mode and the second mode comprises rotating a polarity rotator 90 degrees.

22. The method of claim 21, further comprising:
projecting a third distribution of light by the diffractive element when the received light has a third polarity that is offset relative to the first polarity and the second polarity for a light projector operating in a third mode, wherein the third distribution of light is a combination of the first distribution of light projected by the first diffractive optical element and the second distribution of light projected by the second diffractive optical element; and rotating the polarity rotator in switching the light projector between the first mode and the third mode or between the second mode and the third mode.

23. The method of claim 17, further comprising polarizing with the first polarity the emitted light from the light source, wherein the light source emits unpolarized light.

24. The method of claim 15, wherein emitting the light by the light source comprises emitting infrared light by the light source, the method further comprising receiving reflections of the infrared light by an infrared receiver.

25. The method of claim 24, further comprising determining, by one or more processors, one or more depths in a scene from the received reflections by the infrared receiver.

26. The method of claim 25, further comprising receiving visible light by a color image sensor during capture of an image of the scene.

27. The method of claim 25, further comprising performing wireless communications via one or more transceivers.

28. A device, comprising:
means for emitting light that is polarized;
means for setting a polarity of the emitted light to a first polarity corresponding to a first mode for light projection and for setting the polarity of the emitted light to a second polarity corresponding to a second mode for light projection;
means for projecting a first distribution of light from the emitted light based on the emitted light having the first polarity, the first distribution of light having a first density of projected light points; and
means for projecting a second distribution of light from the emitted light based on the emitted light having the second polarity, the second distribution of light having a second density of projected light points that is different than the first density of projected light points.

* * * * *